(12) United States Patent
Gysling

(10) Patent No.: US 12,298,165 B2
(45) Date of Patent: May 13, 2025

(54) METHODS AND APPARATUS FOR DETERMINING THE SPEED OF SOUND WITHIN A PIPING NETWORK

(71) Applicant: Corvera, LLC, South Glastonbury, CT (US)

(72) Inventor: Daniel Gysling, South Glastonbury, CT (US)

( * ) Notice: Subject to any disclaimer, the term of this patent is extended or adjusted under 35 U.S.C. 154(b) by 0 days.

(21) Appl. No.: 18/681,191

(22) PCT Filed: Aug. 26, 2022

(86) PCT No.: PCT/US2022/041699
§ 371 (c)(1),
(2) Date: Feb. 5, 2024

(87) PCT Pub. No.: WO2023/028324
PCT Pub. Date: Mar. 2, 2023

(65) Prior Publication Data
US 2024/0280393 A1    Aug. 22, 2024

Related U.S. Application Data

(60) Provisional application No. 63/267,127, filed on Jan. 25, 2022, provisional application No. 63/267,130, filed on Jan. 25, 2022, provisional application No. 63/260,592, filed on Aug. 26, 2021.

(51) Int. Cl.
*G01N 9/24*      (2006.01)
*G01F 1/84*      (2006.01)
*G01N 29/024*    (2006.01)

(52) U.S. Cl.
CPC ............. *G01F 1/8436* (2013.01); *G01N 9/24* (2013.01); *G01N 29/024* (2013.01); *G01N 2291/02433* (2013.01)

(58) Field of Classification Search
CPC ....... G01N 9/24; G01N 29/024; G01F 1/8436
See application file for complete search history.

(56) References Cited

U.S. PATENT DOCUMENTS

| | | | |
|---|---|---|---|
| 5,600,073 A | 2/1997 | Hill | |
| 7,406,878 B2 | 8/2008 | Rieder | |
| 7,793,555 B2 * | 9/2010 | Gysling | .................. G01F 1/712 |
| | | | 73/861.354 |
| 8,302,489 B2 | 11/2012 | Bell | |
| 8,641,813 B2 * | 2/2014 | Gysling | .................... G01F 1/74 |
| | | | 96/417 |

(Continued)

FOREIGN PATENT DOCUMENTS

| | | |
|---|---|---|
| WO | 2017108280 A1 | 6/2017 |
| WO | 2021086401 A1 | 5/2021 |

*Primary Examiner* — Jamel E Williams
(74) *Attorney, Agent, or Firm* — Matthew J Patterson

(57) ABSTRACT

In some implementations, a flow measuring device may include a piping network having a region of interest, an inlet region, and outlet region, where the region of interest is configured to provide fluid communication between the inlet region and the outlet region. In addition, the flow measuring device may include a first sensor positioned within the inlet region and a second sensor positioned within the outlet region. The flow measuring device may include a processing unit that determines a speed of sound of a process fluid within the region of interest using the first sensor and the second sensor.

35 Claims, 9 Drawing Sheets

(56) References Cited

U.S. PATENT DOCUMENTS

| | | | |
|---|---|---|---|
| 12,123,889 B2 * | 10/2024 | Gysling | ............ G01N 9/24 |
| 2003/0154036 A1 | 8/2003 | Gysling | |
| 2005/0044929 A1 | 3/2005 | Gysling | |
| 2005/0081643 A1 | 4/2005 | Mattar | |
| 2008/0053240 A1 | 3/2008 | Henry | |

* cited by examiner

METHODS AND APPARATUS FOR DETERMINING THE SPEED OF SOUND WITHIN A PIPING NETWORK

CROSS REFERENCE TO RELATED APPLICATIONS

This Patent Application claims priority to U.S. Provisional Patent Application No. 63/260,592, filed on 26 Aug. 2021, and entitled "UTILIZING AN ARRAY OF PRESSURE SENSORS THAT SPANS A PIPING NETWORK WHICH INCLUDES THE FLOW TUBES OF A CORIOLIS METER TO DETERMINE PROCESS FLUID SPEED OF SOUND"; and to U.S. Provisional Patent Application No. 63/267,127, filed on 25 Jan. 2022, and entitled "A SPEED OF SOUND AUGMENTED CORIOLIS METER UTILIZING EMBEDDED AND AUXILIARY ACOUSTIC SENSORS"; U.S. Provisional Patent Application No. 63/267,130, filed on 25 Jan. 2022, and entitled "A SOS AUGMENTED CORIOLIS METER UTILIZING EMBEDDED AND AUXILIARY ACOUSTIC SENSORS WITH EXPERIMENTAL DATA"; as well as Patent Cooperation Treaty Patent Application No. PCT/US 22/41699, filed on 26 Aug. 2022, and entitled "METHODS AND APPARATUS FOR DETERMINING THE SPEED OF SOUND WITHIN A PIPING NETWORK". The disclosure of the prior Applications are considered part of and are incorporated by reference into this Patent Application.

BACKGROUND

Embodiments of the disclosure generally relate to apparatus and methods for determining flow characteristics in process fluid piping systems and flow meters in inhomogeneous and compressible process fluid flow regimes.

It is known that augmenting a Coriolis meter with a process fluid sound speed measurement can improve the utility and accuracy of a Coriolis meter in multiphase flows in general, and in bubbly liquid flows in particular.

Although there a several known methods to provide a process fluid sound speed measurement to augment Coriolis meters, no method has been developed to provide process fluid speed of sound measurement for which the cost/benefit of the adding a process fluid sound speed measurement has been found to broadly meet the constraints of the commercial Coriolis meters market.

Adding a process fluid sound speed measurement to a Coriolis meter can increase the cost of the measurement in many ways. These costs can include financial costs of developing and manufacturing a solution, costs associated with increased risk in the reliability of additional components, complexity costs associated with increasing the physical size of the instrument and increasing the complexity of installation and commissioning costs, and the complexity costs associated with unknown reliability of the additional measurement. Thus, although the performance of Coriolis meters in multiphase flow could be improved with a process fluid sound speed measurement, no solution has been introduced that effectively addresses broad market needs in a cost-effective manner.

Prior art methods of determining the speed of sound of fluid within a conduit require providing an array of sensors positioned on the conduit of interest. As used herein, the conduit of interest means the conduit (or pipe, duct, etc) within which the measurement of the speed of sound of a process fluid is sought. An example of such prior art methods and systems are disclosed in U.S. Pat. No. 6,862,920B2, issued on Mar. 8, 2005, titled "FLUID PARAMETER MEASUREMENT IN PIPES USING ACOUSTIC PRESSURES". In some environments it is undesirable, impractical or impossible to position sensors on the conduit of interest. One such environment is where it is desired to know the speed of sound of a process fluid within the flow tubes of a Coriolis meter. One prior art attempt to augment a Coriolis meter with a speed of sound measurement is disclosed in U.S. Pat. No. 7,152,460B2, issued on Dec. 26, 2006, titled "APPARATUS AND METHOD FOR COMPENSATING A CORIOLIS METER" (the '460 patent). The embodiments disclosed in the '460 patent teach determining the speed of sound within the flow tubes of a Coriolis meter by placing sensors on the flow tubes themselves. Other embodiments disclosed in the '460 patent teach determining the speed of sound of a fluid in a conduit completely outside of, and apart from, the Coriolis meter and not within the conduit of interest.

What is needed is a cost effective, practical and reliable means to provide a process fluid speed of sound measurement of a pipe of interest within a piping network.

SUMMARY

A system of one or more processing units or computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a fluid flow measuring system may include a piping network having a region of interest, an inlet region, and outlet region, where which the region of interest is configured to provide fluid communication between the inlet region and the outlet region. The fluid flow measuring system may also include a first sensor positioned within the inlet region and a second sensor positioned within the outlet region. The fluid flow measuring system may furthermore include a processing unit that determines a speed of sound of a process fluid within the region of interest using the first sensor and the second sensor. Other embodiments of this aspect include corresponding computer systems, apparatus, and computer programs recorded on one or more computer storage devices, each configured to perform the actions of the methods.

Implementations may include one or more of the following features. The fluid flow measuring system where the region of interest has a region of interest cross-sectional area, the inlet region has an inlet region cross-sectional area, the outlet region has an outlet region cross-sectional area, and where the region of interest cross-sectional area is significantly different than the inlet region cross-sectional area and the outlet region cross-sectional area. The fluid flow measuring system where the first sensor is configured to measure a first acoustic pressure in the inlet region and the second sensor is configured to measure a second acoustic pressure in the outlet region and to produce a first sensor signal and a second sensor signal. The fluid flow measuring system where the processing unit determines the speed of sound of the process fluid in the region of interest using the first sensor signal and the second sensor signal using a beam forming technique. The fluid flow measuring system where the processing unit determines a parameter of the process fluid using the speed of sound. The fluid flow measuring system where the parameter of the process fluid is a gas void fraction of the process fluid. The fluid flow measuring system where the region of interest has a region of interest length, the fluid flow measuring system further may include an array aperture substantially equal to the region of interest length and where the processing unit determines the speed of sound of the process fluid within the array aperture. The fluid flow measuring system may include a fluid measurement device including the region of interest configured to provide a measured parameter of the process fluid where the processing unit is further configured to correct the measured parameter using the speed of sound. The fluid flow measuring system where the fluid measurement device may include a Coriolis meter configured to provide any of a measured density of the process fluid, a volumetric flow rate of the process fluid and a measured mass flow of the process fluid, the processing unit further configured to provide any of a corrected density of the process fluid, a corrected volumetric flow, and a corrected mass flow of the process fluid using the speed of sound. The fluid flow measuring system may include an inlet flange positioned in the inlet region having an inlet flange pressure port, an outlet flange positioned in the outlet region having an outlet flange pressure port, where the region of interest is at least one flow tube of the Coriolis meter positioned between the inlet flange and the outlet flange, and where the first sensor is disposed within the inlet flange pressure port and the second sensor is disposed within the outlet flange pressure port. The fluid flow measuring system may include an inlet throat positioned in the inlet region having an inlet throat pressure port, an outlet throat positioned in the outlet region having an outlet throat pressure port, where the region of interest is at least one flow tube of the Coriolis meter positioned between the inlet throat and the outlet throat, and where the first sensor is disposed within the inlet throat pressure port and the second sensor is disposed within the outlet throat pressure port. The fluid flow measuring system where the piping network may include a variable volumetric acoustic impedance along a length of the piping network. The fluid flow measuring system where the varying volumetric acoustic impedance produces a presence of a plurality of reflections of incident acoustic waves in the process fluid, and where the processing unit determines the speed of sound of the process fluid within the region of interest in the presence of the plurality of reflections of incident acoustic waves. The fluid flow measuring system where the varying volumetric acoustic impedance may include any of a cross sectional area change, an elasticity change, a pressure drop, a coupling, a fitting, an orifice plate, a differential pressure flow meter, a Venturi flow meter and a turbine meter. The fluid flow measuring system where the piping network further may include an inlet pipe positioned in the inlet region and an outlet pipe positioned in the outlet region, and where the first sensor is positioned within the inlet pipe and the second sensor is positioned within the outlet pipe. The fluid flow measuring system where at least one of the inlet pipe and the outlet pipe are coupled to the region of interest with a coupling device having a cross-sectional area that is significantly different than an inlet pipe cross-sectional area and an outlet pipe cross-sectional area. Implementations of the described techniques may include hardware, a method or process, or a computer tangible medium.

In one general aspect, a method may include providing a piping network having a inlet region an outlet region and a region of interest positioned therebetween. The method may also include providing a process fluid within the piping network. The method may furthermore include positioning a first sensor within the inlet region. The method may in addition include positioning a second sensor within the outlet region. The method may moreover include determining with a processing unit a speed of sound of the process fluid within the region of interest using the first sensor and the second sensor. Other embodiments of this aspect include corresponding computer systems, apparatus, and computer programs recorded on one or more computer storage devices, each configured to perform the actions of the methods.

Implementations may include one or more of the following methods. The method where the region of interest has a region of interest cross-sectional area, the inlet region has an inlet region cross-sectional area, the outlet region has an outlet region cross-sectional area, and where the region of interest cross-sectional area is significantly different than the inlet region cross-sectional area and the outlet region cross-sectional area. The method may include measuring a first acoustic pressure in the inlet region with the first sensor, measuring a second acoustic pressure in the outlet region with the second sensor, and producing a first sensor signal and a second sensor signal. The method includes determining with the processing unit the speed of sound of the process fluid in the region of interest using the first sensor signal and the second sensor signal using a beam forming technique. The method may include determining with the processing unit a parameter of the process fluid using the speed of sound. The method where the parameter may include determining a gas void fraction of the process fluid. The method where the region of interest has a region of interest length having an array aperture, the method may include determining with the processing unit the speed of sound of the process fluid within the array aperture. The method may include providing a fluid measurement device within the region of interest, measuring with the fluid measurement device a measured parameter of the process fluid, correcting with the processing unit the measured parameter using the speed of sound. The method where the fluid measurement device may include a Coriolis meter, the method may include providing with the Coriolis meter any of a measured density of the process fluid, a volumetric flow rate of the process fluid and a measured mass flow of the process fluid, and correcting with the processing unit any of a corrected density of the process fluid, a corrected volumetric flow, and a corrected mass flow of the process fluid using the speed of sound. The method may include positioning an inlet flange in the inlet region having an inlet flange pressure port, positioning an outlet flange in the outlet region having an outlet flange pressure port, where the region of interest is at least one flow tube of the Coriolis meter positioned between the inlet flange and the outlet flange, and disposing the first sensor within the inlet flange pressure port, and positioning the second sensor within the outlet flange pressure port. The method may include positioning an inlet throat in the inlet region having an inlet throat pressure port, positioning an outlet throat in the outlet region having an outlet throat pressure port, where the region of interest is at least one flow tube of the Coriolis meter positioned between the inlet throat and the outlet throat, and positioning the first sensor within the inlet throat pressure port, and positioning the second sensor within the outlet throat pressure port. The method may include varying a volumetric acoustic impedance along a length of the piping network. The method may include producing with the varying volumetric acoustic impedance a plurality of reflections of incident acoustic waves in the process fluid, and determining with the processing unit the speed of sound of the process fluid within the region of interest in the presence of the plurality of reflections of incident acoustic waves. The method where the varying the volumetric acoustic impedance may include any of a cross sectional area change, an elasticity change, a pressure drop, a coupling, a fitting, an orifice plate, a differential pressure flow meter, a Venturi flow meter and a turbine meter. The method may include positioning an inlet pipe in the inlet region positioning an outlet pipe in the outlet region, positioning the first sensor within the inlet pipe, and positioning the second sensor within the outlet pipe. The method may include providing a coupling device having a cross-sectional area that is significantly different than an inlet pipe cross-sectional area and an outlet pipe cross-sectional area, and coupling at least one of the inlet pipe and the outlet pipe to the region of interest to the coupling device. Implementations of the described techniques may include hardware, a method or process, or a computer tangible medium.

DETAILED DESCRIPTION

Figure 1:
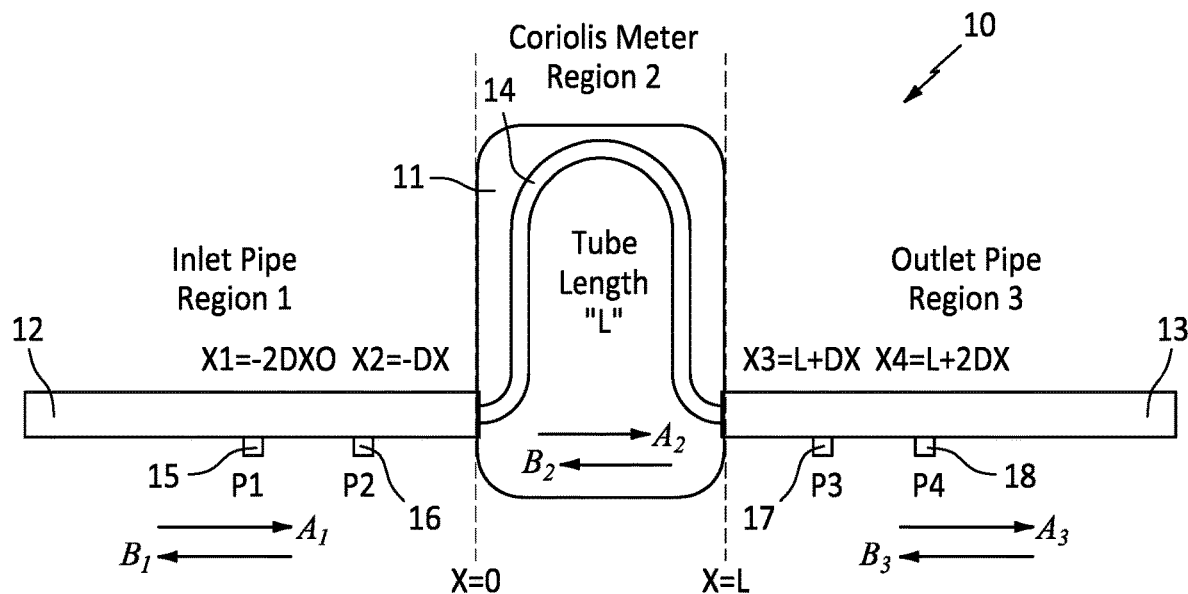
FIG. 1 is a schematic diagram of a system for determining the sound speed of a process fluid in a piping network in accordance with the present disclosure.

It has been discovered that a process fluid parameter namely the speed of sound of a process fluid within a conduit of interest can be accurately determined by using an array of pressure sensors positioned spanning an inlet of the conduit of interest and an outlet of the conduit of interest. Using the techniques disclosed herein below, the speed of sound of a process fluid within a conduit of interest can be accurately determined even when significant cross-sectional areas, pressure drops or acoustic impedances vary greatly within the array.

It has been further discovered that when augmenting a Coriolis meter with a process fluid sound speed measurement, it is preferable to measure the sound speed of the fluid within Coriolis flow tubes, rather than in the surround piping networks. It is preferable to measure the sound speed of the process fluid within the Coriolis flow tubes directly rather than in the surrounding piping network because the sound speed of the process fluid within the flow tubes of the Coriolis meter is most closely linked with the errors developed within Coriolis meters due to bubbly flows. And, since the sound speed of the process fluid within the surrounding piping of a Coriolis meter may differ significantly from the speed of sound of the process fluid within the Coriolis flow tubes, measuring the sound speed of the process fluid within the flow tubes directly provides a preferred measurement for use in correcting Coriolis flow meters for the effects of bubbly flows Differences between the process fluid sound speed in the Coriolis flow tubes and that in the surrounding piping can be attributed to several factors, including, but not limited to: 1) the often significant pressure drop the occurs though the tubes of a Coriolis meter which will tend to increase gas void fraction of an existing entrained gas with decreasing pressure and additionally potentially result in additional outgassing of gases dissolved in the liquid with decreasing pressure of the process fluid; and 2) since the mixture flow velocity and orientation (with respect to gravity) of the process fluid within the Coriolis flow tubes can differ from those conditions in the inlet and outlet piping, the gas void fraction in the Coriolis flow tubes can differ from that within the process piping due to gas and liquid hold-up effects. Gas hold-up can be defined as a condition in the gas void fraction in a section of a pipe differs from the gas volume fraction due to the gas and the liquid moving at different velocities with a conduit. Such differences in gas void fraction and gas volume fraction often occur in stratified and or non-well mixed flows. Note also that, since Coriolis flow meters often have flow tubes with a total cross sectional area that is less than that of the surrounding piping, the flow velocity is typically higher within the Coriolis flow tubes, resulting reduced gas hold-up within the flow tubes compared the process fluid piping.

It is known by those skilled in the art that mixture flow velocity and piping orientation with respect to gravity can have significant influence on the distribution of gas bubbles within a bubble flow. Companies that engineer and manufacture Coriolis meters recommend orienting their bent tube Coriolis meters in the flag mount position (FIG. 12) with flow flowing vertically upward through the meter when operating on bubbly fluids to minimize gas and liquid hold-up effects. Additionally, companies that engineer and manufacture Coriolis meters recommend sizing the Coriolis meter to maintain high flow rates through the flow tubes to further minimize gas and liquid hold-up within the flow tubes.

Following these best practices typically results in the bubbly flows being more well-mixed in the flow tubes of the Coriolis meter compared to surrounding piping. Often the inlet and outlet piping, when present, (i.e. sometimes Coriolis meters are installed in close proximity to pressure valves or tanks or other components other than inlet and outlet piping) have limited vertical sections, with the majority of the piping in the horizontal orientation. Additionally, the surrounding piping typically has a larger cross-sectional area than the combined cross-sectional area of the Coriolis flow tubes. Additionally, the process pressure within the inlet and outlet piping can often differ significantly from the process pressure within the flow tubes of the Coriolis meter. These and other conditions often result in significant differences in gas void fraction within the process piping adjacent to the Coriolis meter compared to the gas void fraction within the Coriolis flow tubes. Variations in the gas void fraction will result in variations in the process fluid sound speed.

Thus, from a measurement perspective, and as set forth in this disclosure, when utilizing a process fluid sound speed measurement to compensate for the effects of bubbly fluids on a Coriolis meter, it is preferable to measure the sound speed of the process fluid within flow tubes of the Coriolis meter, rather than within piping adjacent to the meter.

However, measuring the sound speed of the process fluid utilizing the known techniques of utilizing an array of pressure sensors installed on the conduit containing the process fluid requires access to the flow tubes of the Coriolis meter. Using the example disclosed herein above, Gysling discloses in the '460 patent, the use of an array of strain-based pressure sensors installed on the flow tubes of a Coriolis meter. While this approach can effectively measure the speed of sound of the process fluid within the flow tubes, there are significant technical challenges to make this measurement commercially viable. Many of these challenges are associated with the difficulty in mechanically accessing the flow tubes. The flow tubes of modern Coriolis meters are typically contained within pressure-rated housings that are hermetically sealed at the factory. Any breach to this housing effectively nullifies any warranties, calibrations, and hazardous area ratings associated with the Coriolis meter. Since installing either ported or clamp-on sensors would require accessing the flow tubes and thus breaching the factory sealed housing, this approach is not considered practical for a majority of retrofit applications. In addition, the length of the array in such an embodiment can be too short to accurately determine the sound speed of the process fluid.

In some situations, it may be more practical to consider installing an array of pressure sensors on the flow tubes of a Coriolis meter during the manufacturing process, before the housings are installed. However, in additional to the resources required to develop and design such an embodiment, this approach has many fundamental drawbacks as well. For example, the vibrational characteristics of Coriolis meters are highly engineered to provide accurate and reliable measurement for many years without service. The actuators and sensors currently used on Coriolis meters have evolved over many years to be highly precise and reliable. Adding additional sensors would introduce additional cost, complexity, and potentially reliability issues. Adding additional wirings associated with one of more pressure sensors on the flow tubes could impact the highly engineered flow tube vibrational characteristics. The additional sensors would also likely introduce additional operating restrictions in terms of temperature or pressure. And once the sensors were installed and the housing installed, there would be limited opportunity to service the additional sensors going forward.

As part of the present disclosure, implementations of a methodology that provides an accurate measure of the speed of sound of the process fluid within the Coriolis flow tubes, but without requiring any mechanical access to the flow tubes themselves is set forth. These implementations include the ability to measure the sound speed of the process fluid within the flow tubes without direct contact with the process fluid at the conditions, (i.e., pressure, gas void fraction) within the flow tube.

As part of the current disclosure, a system and method are disclosed to measure process fluid speed of sound within the flow tubes of a Coriolis flow meter that does not require direct access to the flow tubes of the Coriolis meter. One advantage of the at least one implementation of the current disclosure is that the disclosed method utilizes the "unwrapped" axial length of the flow tubes to maximize the aperture of the array to determine the sound speed of the process fluid without requiring additional piping length or increasing the meter footprint. Also disclosed is a cost-effective approach to measuring the process fluid speed of sound that utilizes both a common physical footprint and elements of a common electronic infrastructure, such as power supply, enclosure, communication and processing unit as that are currently used to drive and interpret the vibrational characteristics of the flow tubes within a Coriolis meter.

Implementations of the current disclosure teaches the use of passive listening techniques utilizing an array of pressure sensors installed upstream and downstream of the flow tubes on a Coriolis meter. In these implementations, the flow tubes are contained within the aperture of the array of pressure sensors, and in some implementations no sensors are installed on the flow tubes themselves. It should be appreciated by those skilled in the art that, the pressure sensors, which could be wetted or strain-based pressure sensors, can be installed to minimize any influence on the mechanical or the vibrational characteristics of the flow tubes themselves. In fact, in one implementation of this disclosure, and as will be disclosed in more detail herein after, the pressure transducers are installed on the body of the Coriolis meter near where the flanges of a Coriolis meter are attached to the process piping. And as will be disclosed in more detail herein after, adding the pressure sensors within the footprint of the existing Coriolis flow meter, without any modifications to the flow tubes, and incorporating any necessary electronics required to power, measure, and interpret the pressure sensors in terms of process fluid sound speed with the footprint of the existing Coriolis flow meter transmitters, provides additional advantages of this approach compared to other approaches to augmenting a Coriolis meter with a process fluid sound speed measurement.

It should be noted that certain implementations are suitable for both new build Coriolis meters in which the pressure sensors can be integrated into the footprint of the Coriolis meter and the retrofit of existing Coriolis meters in which the pressure sensors are positioned either in or near the existing Coriolis meter.

Referring to FIG. 1, there is shown a schematic diagram of a piping network of a fluid flow measuring system including a fluid measurement device in the form of a sound speed augmented Coriolis meter 10. In this implementation, sound speed augmented Coriolis meter 10 includes a Coriolis meter 11 installed in a piping network including an inlet pipe 12 and an outlet pipe 13. Coriolis meter 11 comprises a bent tube style pair of flow tubes 14 having a length of L. Coriolis meters typically have some type of coupling device such as a flange to fluid mechanically couple the flow tubes the to the inlet pipe 12 as well as a flange to couple with the outlet pipe 13. Inlet pipe 12 is shown as including inlet pressure transducers 15, 16 positioned in close proximity to the Coriolis meter 11. Outlet pipe 13 is shown as including outlet pressure transducers 17, 18 positioned in close proximity to the Coriolis meter. In the implementation shown, sound speed augmented Coriolis meter 10 includes two pressure transducers on each side of the Coriolis meter flow tubes 14 although other implementations are contemplated and disclosed herein after and include any configuration with at least one pressure transducer installed on each side of the flow tubes 14 of a Coriolis meter 11. For illustrative purposes, the location of the pressure sensors are parameterized as follows: The coordinate system of the sound speed augmented Coriolis meter 10 is such that X=0 at the inlet of the Coriolis meter 11 and X=L at the outlet of the Coriolis meter. Pressure transducer 16 is positioned at $X_2$ which is some distance D from X=0 and pressure transducer 15 is positioned at $X_1$ which can be a distance of 2D from X=0. Similarly, pressure transducer 17 is positioned at $X_3$ which is some distance D from X=L and pressure transducer 18 is positioned at $X_4$ which can be a distance of 2D from X=L.

For the configuration which utilizes 2 pressure sensors on either side of the Coriolis meter, the disclosed approach utilizes passive listening techniques to interpret the output of two sensors to measure the sound speed of the process fluid within the Coriolis meter, while only directly measuring pressures associated with process fluid contained in different conduits (inlet and outlet piping compared to the flow tubes) and at different physical conditions (inlet and outlet are often at significantly different pressures and cross sectional areas) and at conditions for which the sound speed of the process fluid at each measurement location can be significantly different than the sound speed of process fluid within the flow tubes.

Another advantage of utilizing an array of pressure sensors that span the flow tubes of a Coriolis meter is that the flow tubes are effective in transmitting coherent acoustic pressure waves through the flow tubes, but are also effective at minimizing the transmission of coherent structural and vortical disturbances. This preferential transmission of acoustic pressure waves compared to other types of disturbances that can cause coherent signals among the sensors in an array enables an embodiment in which the flow tubes of a Coriolis meter are contained to provide an improved interpretation of the speed of sound compared to an array of sensors contained on single fluid conduit. From a vortical disturbance perspective, the relative high length to diameter ratio of bent tube Coriolis meters effectively minimizes any coherence associated with vortical disturbances measured using sensors separated by the axial length of the flow tubes of the Coriolis meter, and the structure design of Coriolis meter also serves to minimize any coherence of the many types of structural wave that are often present within a single conduit, such as a pipe, including bending waves, torsional waves, and compression waves.

It should be appreciated by those skilled in the art that most Coriolis meters are typically designed with a structure support that transfers any often large structural loads that develop in the piping network from the inlet flange to the outlet flange. Although not shown schematically in FIG. 1, this structural support is designed to isolate the vibrating flow tubes from structural loads and vibration within the piping network. As will be disclosed in more detail herein after, at the inlet and outlet of a Coriolis meter 11, there is transition region in which the flow is directed from the piping network into the flow tubes 14 and out of the flow tubes into the piping network, and the structural loads are essentially transferred from the aforementioned flanges to the support structure. This transition region is well-suited for the positioning of the pressure transducers in fluid communication with the flow path but, since they are installed on support structure, the pressure sensors do not materially influence the vibrational characteristics of the flow tubes. It has been discovered that pressure transducers in these regions will, in general, measure the acoustic pressures in a region that is in communication with, but not installed on, the flow tubes 14, and are contained within the physical footprint of the Coriolis meter.

Still referring to FIG. 1, inlet pipe 12 is comprised of a pipe with an inlet pipe cross-sectional area of S1, the combined cross sectional area of one or more flow tubes 14 of the Coriolis meter 11 is S2, and the outlet pipe cross-sectional area of the outlet pipe 13 is S3. It should be appreciated by those skilled in the art that, an aspect of this disclosure is that for one-dimensional acoustic waves for which the wavelength is long compared to the diameter of the pipe, including the wavelengths (and therefore the associated frequencies, for which the speed of sound is representative of the gas volume fraction of a bubbly liquid) the inlet pipe 12, flow tubes 14 and outlet pipe 13 essentially serve as a wave guides, with the acoustics waves following the curvature of the flow path without generating any significant reflections. Thus, the relevant geometric aspect of the flow tubes is length as would be determined by a line integral of the centerline of the curved flow path of flow tubes 14. Also, it is known that for such long wave length acoustic waves, changes in the effective cross sectional area, such as at the transition from the process piping to the one or more flow tubes, will typically introduce acoustic reflections, the strength of which will scale with the change the area ratio of change in the cross sectional area.

The sound speed augmented Coriolis meter 10 can be comprised of an inlet region (Region 1) having an inlet region cross-sectional area comprised of inlet pipe 12, a region of interest (Region 2) (the region of the piping network within which the speed of sound of the process fluid is sought) comprised of flow tubes 14 of the Coriolis meter 11 and having a region of interest cross-sectional area and an outlet region (Region 3) having an outlet region cross-sectional area comprised of outlet pipe 13. The one-dimensional sound field in each of these three regions respectively, can be modelled as a summation of right travelling waves $A_1$, $A_2$, $A_3$ and left travelling waves $B_1$, $B_2$, $B_3$. (reference Munjal, M. L., "Acoustics of Ducts and Mufflers", John Wiley and Sons, New York, 1987) Each frequency component of the acoustic field can be expressed as follows:

$$p_{R1}(x, t) = A_1 e^{i(\omega t - kx)} + B_1 e^{i(\omega t + kx)} \qquad \text{Equation 1}$$

$$p_{R2}(x, t) = A_2 e^{i(\omega t - kx)} + B_2 e^{i(\omega t + kx)} \qquad \text{Equation 2}$$

$$p_{R3}(x, t) = A_3 e^{i(\omega t - kx)} + B_3 e^{i(\omega t + kx)} \qquad \text{Equation 3}$$

Where Ai and Bi represent the complex amplitudes of the right and left travelling waves in each region. The acoustic pressure fields upstream and downstream of the flow tubes 14 of the Coriolis meter 11 can be related by applying pressure and mass flow continuity boundary conditions at the area discontinuities at X=0 and X=L, corresponding to the inlet and the outlet of the Coriolis meter. As disclosed here in above and below, it should be noted that positioning the pressure transducers 16 and 17 at x=0 and x=L respectively, i.e., within the boundary of the Coriolis meter 11, is within the scope of the present disclosure. Note also that the location of pressure sensors 16 and 17 could be on the external piping, or within the body of the Coriolis meter without loss of generality.

It is known that Coriolis meters can utilize dual, bent tube flow tubes 14. It is also known that the cross sectional area of the flow tubes 14 can be smaller than the cross sectional area of inlet pipe 12 and outlet pipe 13. Assuming that the fluid properties within each of the flow tubes 14 of the Coriolis meter 11 are sufficiently uniform, for this model, it is assumed that the acoustic waves in multiple flow tubes are synchronized and the multiple flow tubes behave acoustically as a single conduit with cross sectional area equal to the sum of the cross sectional area of the multiple flow tubes.

Any change in the effective cross sectional area of a conduit within which a one dimensional acoustic wave is propagating is well known to cause reflections of acoustic waves. As part of the present disclosure, the cross sectional area changes cause reflections of propagating, one-dimensional acoustic waves at the inlet and the exit of the Coriolis meter. The reflection coefficient associated with a cross sectional area change is defined as the amplitude of the reflected wave, divided by the amplitude of the incident wave for an incident wave encountering a cross sectional area change (with an anechoic downstream termination). The reflection coefficient from a region with a cross sectional area of S1 to a region with a cross sectional area of S2 can be express as the ratio of incident acoustic wave to the reflected acoustic wave and is known and is given by the following equation:

$$R \equiv \frac{B}{A} = \frac{1 - \frac{S_2}{S_1}}{1 + \frac{S_2}{S_1}} = \frac{S_1 - S_2}{S_1 + S_2} \qquad \text{Equation 4}$$

Since Coriolis meters are often sized to maintain increased flow velocity within the Coriolis flow tubes, area ratios of S2/S1=0.5 or smaller are not uncommon. An area ratio of 0.5 results in a relatively significant reflection coefficient of 0.33, indicating that at the entrance to the Coriolis meter, ⅓ of the incident acoustic pressure field is reflected back into inlet pipe 12.

In general, and for purposes of this disclosure, it can be assumed that the inlet and outlet regions of the Coriolis meter are similar, and as such additional reflections occur when an acoustic wave propagating within a flow tube encounters an area expansion at the exit of the flow tubes 14. In general, reflections due to area changes cause the amplitude of the acoustic waves propagating within a piping network to vary where they would otherwise have a constant amplitude. Specifically, these reflections may cause the amplitudes of the right travelling waves $A_1$, $A_2$, $A_3$ and left travelling waves $B_1$, $B_2$, $B_3$ in the respective regions upstream of a Coriolis meter, within the flow tubes, and downstream of the Coriolis meter 11 to differ substantially and for these difference to be as a function of frequency, compared to the relatively constant amplitude conditions that would exist if the cross sectional area of the flow tubes was matched to the cross section area of the piping sections upstream and downstream of the Coriolis meter.

As part of the present disclosure, the effects of these reflections are modelled utilizing one-dimensional acoustics. For one-dimensional acoustic pressure fields for which the speed of sound is much larger than the flow velocity $$\left(\text{i.e. } M_x = \frac{U_x}{a} \ll 1\right),$$

the acoustic pressure and the acoustic axial velocities perturbations of the one-dimensional acoustic waves can be expressed as a function of position and time as follows:

$$P_i(x, t) = A_i e^{i(\omega t - kx)} + B_i e^{i(\omega t + kx)} \qquad \text{Equation 5}$$

and $$U_i(x, t) = \left(A_i e^{i(\omega t - kx)} - B_i e^{i(\omega t + kx)}\right) / \rho c$$

Where $A_i$ and $B_i$ represent the complex amplitudes of the right and left travelling waves respectively.

The pressure fields in Region 1 and Region 3 can be related to each other by applying pressure and mass flow continuity at the interfaces at x=0, $$P_{x=0^-} = P_{x=0^+}$$

and $$S_1 U_{x=0^-} = S_2 U_{x=0^+}$$

and at x=L, $$P_{x=L^-} = P_{x=L^+}$$

and $$S_2 U_{x=L^-} = S_3 U_{x=L^+}$$

Applying these relationships, the pressure field in Region 1 can be related the pressure field in Region 3 as follows:

Equation 6

$$\frac{A_3}{A_1} = \frac{(S_2 + S_1) - \alpha(S_2 - S_1)e^{2ikL}}{\beta} + \frac{(S_2 - S_1) - \alpha(S_2 + S_1)e^{2ikL}}{\beta} \frac{B_1}{A_1}$$

$$\frac{B_3}{A_1} = \frac{S_2 - S_1}{S_2 + S_3} + \frac{S_2 + S_1}{S_2 + S_3} \frac{B_1}{A_1} - \alpha e^{-2ikL} \frac{A_3}{A_1} \qquad \text{Equation 7}$$

where:

$$\alpha \equiv \frac{S_2 - S_3}{S_2 + S_3}$$

and $$\beta \equiv (S_2 + S_3) - \alpha(S_2 - S_3)$$

Using these relationships, pressures at the sensor locations can be simulated and the simulated pressures can be used as input to beam forming algorithms to assess the ability of the beamforming algorithms to determine the speed of sound based on these simulated measurements for a range of flow path geometries.

Specifically, for a unit amplitude for the right traveling wave in Region 1, i.e. $A_1$, and a random amplitude and phase of the left traveling wave in Region 1, i.e. $B_1$, the measured pressures at pressure transducers 15, 16, 17, 18 are given by:

$$p_{15}(\omega) = e^{i\omega t} + B_1/A_1 e^{i\omega t} \qquad \text{Equation 8}$$

$$p_{16}(\omega) = e^{i(\omega t - kx_2)} + B_1/A_1 e^{i(\omega t + kx_2)} \qquad \text{Equation 9}$$

$$p_{17}(\omega) = A_3/A_1 e^{i(\omega t - kx_3)} + B_3/A_1 e^{i(\omega t + kx_3)} \qquad \text{Equation 10}$$

$$p_{18}(\omega) = A_3/A_1 e^{i(\omega t - kx_4)} + B_3/A_1 e^{i(\omega t + kx_4)} \qquad \text{Equation 11}$$

The relationships of Equations 8-11 represent the Fourier coefficients for each frequency of the simulated pressures measured at the locations of the pressure transducers 15-18 associated with a unit amplitude of incident (right travelling) pressure wave in Region 1. Performing the simulation in this manner results in a general condition in which can model conditions for which there are arbitrary levels of right travelling and left traveling waves in each region of the flow field.

These simulated pressures can be interpreted utilizing beamforming algorithms. Beamforming, as used herein, involves defining a steering vector that accounts for an expected phase shift among the measured, or in this case simulated, pressures. Typically, beamforming algorithms for determining flow parameters, such as flow velocity and process fluid speed of sound, have been applied to measurements from acoustic pressure sensors for which the cross sectional area of the fluid conduit is constant.

The steering vector for data measured from pressure transducers 15-18 is given by the following:

$$E = \begin{Bmatrix} e^{-ikx_1} \\ e^{-ikx_2} \\ e^{-ikx_3} \\ e^{-ikx_4} \end{Bmatrix} \qquad \text{Equation 12}$$

Where k is defined as the wave number, $$k = \frac{\omega}{c},$$

where c is the speed of sound and w is the frequency in radians/sec. In this formulation of the steering vector, positive wave numbers are associated with waves traveling in the positive "X" direction (from left to right) and negative wave numbers are associated with waves traveling in the negative "X" direction (from right to left).

The cross spectral density matrix is composed of the cross spectral densities of the measured or simulated pressures at each location:

$$CSD = \begin{bmatrix} P_{11} & P_{12} & P_{13} & P_{14} \\ P_{21} & P_{22} & P_{23} & P_{24} \\ P_{31} & P_{32} & P_{33} & P_{34} \\ P_{41} & P_{42} & P_{43} & P_{44} \end{bmatrix} \qquad \text{Equation 13}$$

Where $P_{ij}=P_i*P_j*$, where $P_i$ and $P_j*$ are the Fourier transforms of the pressures at location i and the complex conjugate of the Fourier transform at location j.

Modifying the techniques described in D. H. Johnson and D. E. Dudgeon. *Array Signal Processing, Concepts and Techniques*. PTR Prentice-Hall, Upper Saddle River, N J, 1993, the beamforming optimization process of the current disclosure involves adjusting the steering vector, which is a function of the speed of sound of the process fluid, to maximize the power associated with a given steering vector. The power of the array is given by the following:

$$P = E^T[CSD]E \qquad \text{Equation 14}$$

Where $E^T$ is the conjugate transpose of the steering vector, E.

The above is an example of determining the speed of sound from an array of four pressure transducers using beam forming techniques. It should be appreciated that the methods disclosed are scalable for any number of pressure transducers, from two pressure transducers on up.

Figure 2:
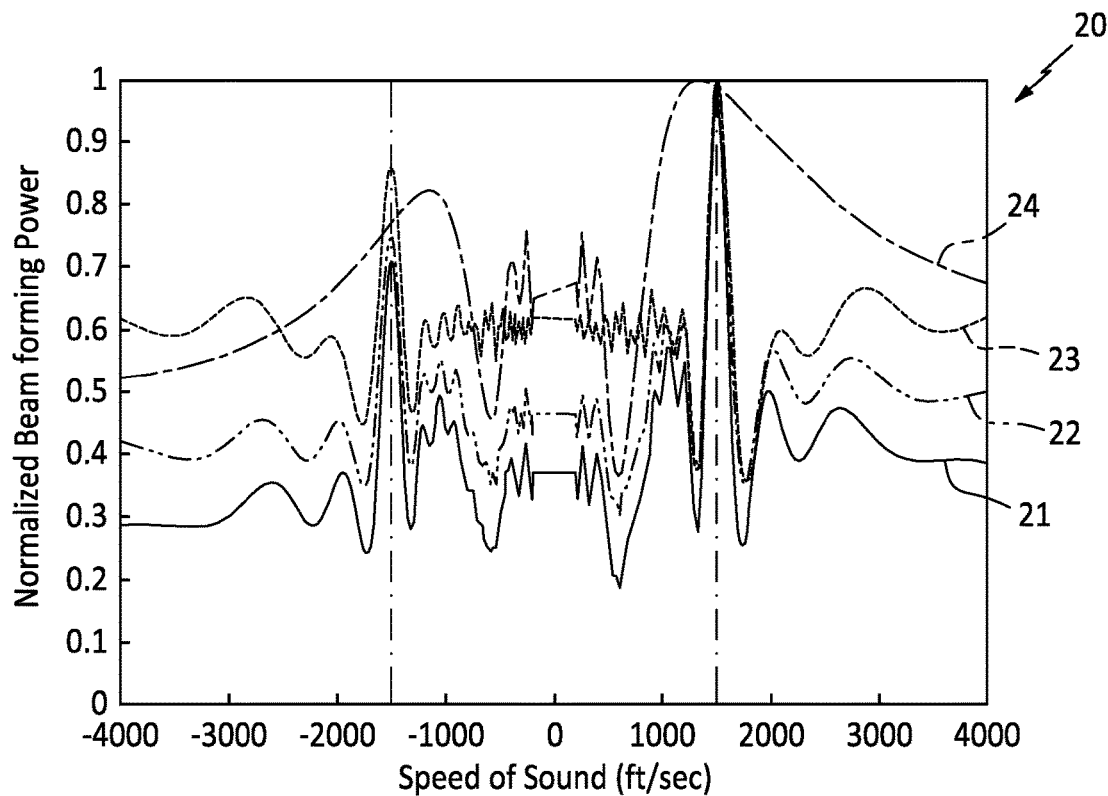
FIG. 2 is a graphical representation of the determination of the sound speed of a process fluid in a piping network in accordance with the present disclosure.

Now with further reference to FIG. 2, there is shown a graphical representation 20 of the normalized power from the output of several configurations involving the pressure transducers 15-18 with a piping network comprising the conduits of Region 1, Region 2 and Region 3 having the same cross sectional area, i.e. this simulation represents a configuration for which the cross sectional area of the inlet piping and exit piping is matched to the cross sectional area of the flow tubes of the Coriolis meter. Line 21 depicts Array 1234 which utilizes pressure transducers 15-18, line 22 depicts Array 123 which utilizes pressure transducers 15-17, line 23 depicts Array 12 which utilizes pressure transducers 15 and 16, and line 24 depicts Array 23 which utilizes pressure transducers 17 and 18.

The simulation parameters used to generate graphical representation 20 were selected to represent a commercial 2 inch dual, bent tube Coriolis meter 11 installed in process piping wherein inlet pipe 12 and outlet pipe 13 comprise a length of at least one foot each. These assumptions were used to illustrate novel aspect of implementations of this disclosure and do not represent any restriction to the breadth of this disclosure. For the simulation which produced graphical representation 20, Fourier coefficients were simulated for frequencies from 400 Hz to 1400 Hz, for a process fluid having a speed of sound of 1500 ft/sec. Actual data from an implementation of a sound speed augmented Coriolis meter 10 is disclosed herein after showing good correlation to the simulations disclosed herein.

It should be appreciated by those skilled in the art that passive listening techniques, i.e. a system without active noise generation, in general, require sufficient naturally occurring acoustic noise to accurately and robustly determine the speed of sound of the process fluid. The simulation used herein assumes there is sufficient naturally occurring acoustic noise to provide good coherence among the pressure transducers in the array over a broad of frequencies. Specifically, a range of frequencies from 400 to 1400 Hz were considered in the simulation disclosed immediately herein above. The ambient noise characteristics within any given application may are may not provide such conditions. Some implementations of the current disclosure can include an auxiliary noise source to provide sufficient noise for the pressure transducers to allow the determination of the speed of sound of the process fluid. It should be noted that an acoustic noise source does not need to be in electronic communication with the sensor array. The noise source could be a device specifically intended to generate noise for the purpose of improving the ability of an array of sensors to determine the process fluid speed of sound such as a speaker, or a throttling valve, or it could be a device that generates acoustic noise as part of its normal operation, such as a pump or the turbulent flow of single or multiphase flow.

As disclosed herein above, the results shown in FIG. 2, represent processing of an array of sensors installed on a constant cross section simulation. As shown in graphical representation 20, maximizing the normalized beamforming power using the beamforming methodology disclosed above results estimates of the process fluid sound speed from each of the sensor configurations. Note that the simulation models acoustic waves traveling in both the positive (right) and negative (left) directions, and the array processing detects the "common" speed of sound traveling in each direction. Utilizing the dominance of the peak lines 21-24 of graphical representation 20 at the "correct" sound speed provides a metric for comparison of the various arrays. Based on this metric, Array 1234 provides the "best" estimate, followed by Array 123, then by Array 23, and lastly Array 12. This comparison advantageously shows that utilizing the relative long spacing between pressure transducers for the section of the array that includes the flow tubes 14 of the Coriolis meter 11, with each array configuration containing pressure transducers 16 and 17 provides a distinct and accurate measure of the process fluid sound speed.

It should be appreciated by those skilled in the art that there are many optimization algorithms that perform a similar function to that of the beamforming algorithm used for illustrative purposes herein. While the optimization results of various algorithms can and will differ in various real world signal to noise conditions, the inventive aspect of the current invention are illustrated utilizing the approach described herein and will in general apply the other algorithms as well.

As disclosed herein above, a significant change in the cross sectional area of the conduits comprising the piping network over which the speed of sound is being measured can adversely impact in the ability to determine the speed of sound of the process fluid. That negative impact can best be seen with reference to graphical representation 30 in FIG. 3. Similar to that disclosed with reference to FIG. 2, graphical representation 30 represents the processing of an array of sensors installed on a sound speed augmented Coriolis meter 10 wherein the cross section of flow tubes 14 are 10% of the cross-sectional area of inlet pipe 12 and outlet pipe 13 using the same simulation. This ratio corresponds to a reflection coefficient of 82% for acoustic waves travelling within the piping network and incident upon the area change at either the inlet or the outlet of the Coriolis meter 10. Line 31 depicts Array 1234 which utilizes pressure transducers 15-18, line 32 depicts Array 123 which utilizes pressure transducers 15-17, line 33 depicts Array 12 which utilizes pressure transducers 15 and 16, and line 34 depicts Array 23 which utilizes pressure transducers 17 and 18. As shown in graphical representation 30, Utilizing the dominance of the peak lines 31-34 of graphical representation 30 at the "correct" sound speed provides a metric for comparison of the various arrays. Note that this simulation represents an idealized situation in which the simulated signal only contains coherent acoustic pressure perturbations.

Figure 3:
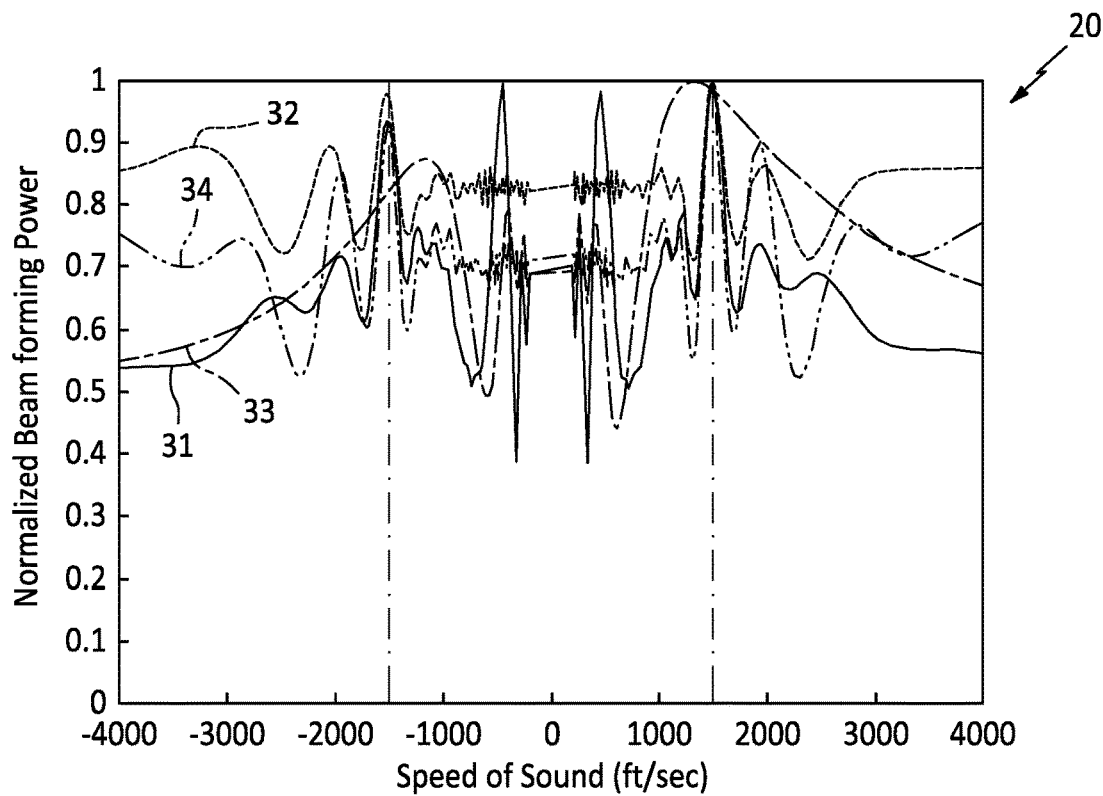
FIG. 3 is a graphical representation of the determination of the sound speed of a process fluid in a piping network in accordance with the present disclosure.

As shown by graphical representation 30, the relatively significant area changes within the domain of the array modify the acoustic field in a manner that significantly degrades the ability of standard beamforming algorithms to accurately and robustly determine the process fluid sound speed. It should be noted that the example shown in FIG. 3 represents a large area reduction through the Coriolis meter. For most applications the area reduction is significantly less, on the order of a 50% area ratio reduction between inlet pipe 12 and outlet pipe 13 compared to the cross sectional area of flow tubes 14.

Figure 4:
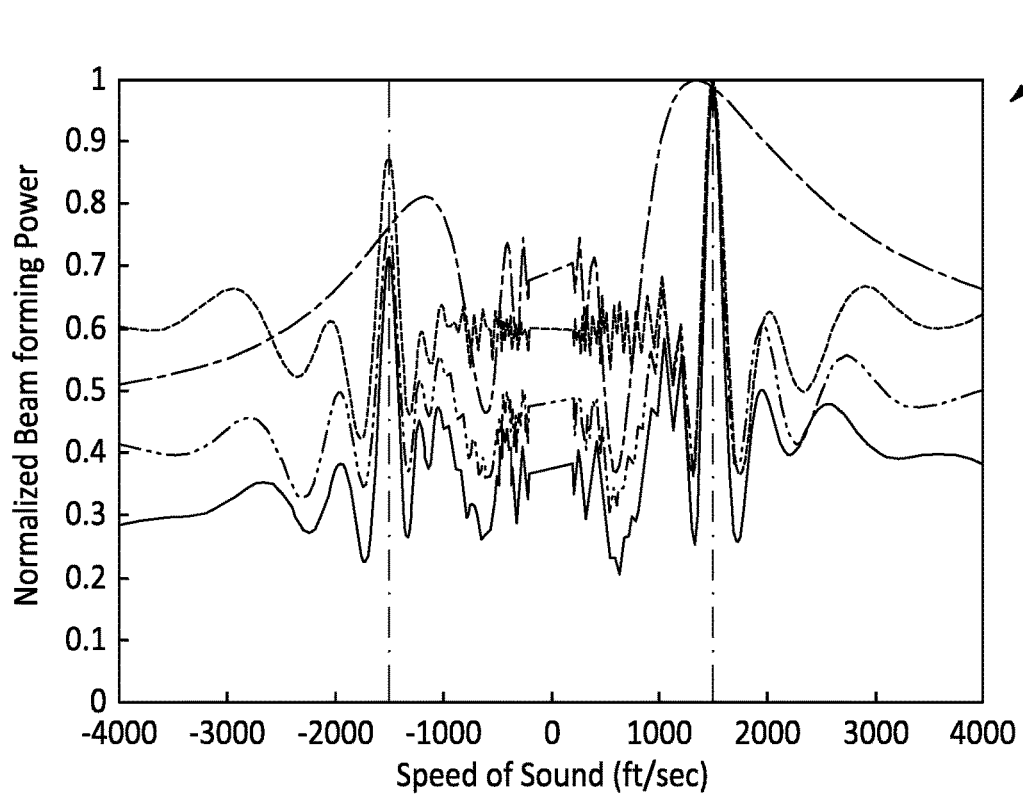
FIG. 4 is a graphical representation of a simulation of the determination of the sound speed of a process fluid in a piping network in accordance with the present disclosure.

Referring next to FIG. 4, there is shown a graphical representation 40 of a simulation of the normalized power from the output of various configurations of a piping network involving pressure transducers 15-18 shown in FIG. 1. In this simulation the flow tubes 14 have a combined cross section area of 60% of the inlet pipe 12 and the outlet pipe 13. This particular configuration corresponds to a reflection coefficient of 25% for acoustic waves travelling within the piping network and incident upon the area change at either the inlet or the outlet of the Coriolis meter. Surprisingly and as shown, the reflections, although relatively significant do not significantly impair the ability of the beam forming algorithms to determine the process fluid sound speed in the albeit idealized simulation Notably, Array 123, Array 234 and Array 23 which are the arrays that contain the relatively large sensor spacing across the flow tubes 14, provide an ability to determine the process fluid speed of sound that is comparable to an array of sensors on a constant area section of conduit.

Figure 5:
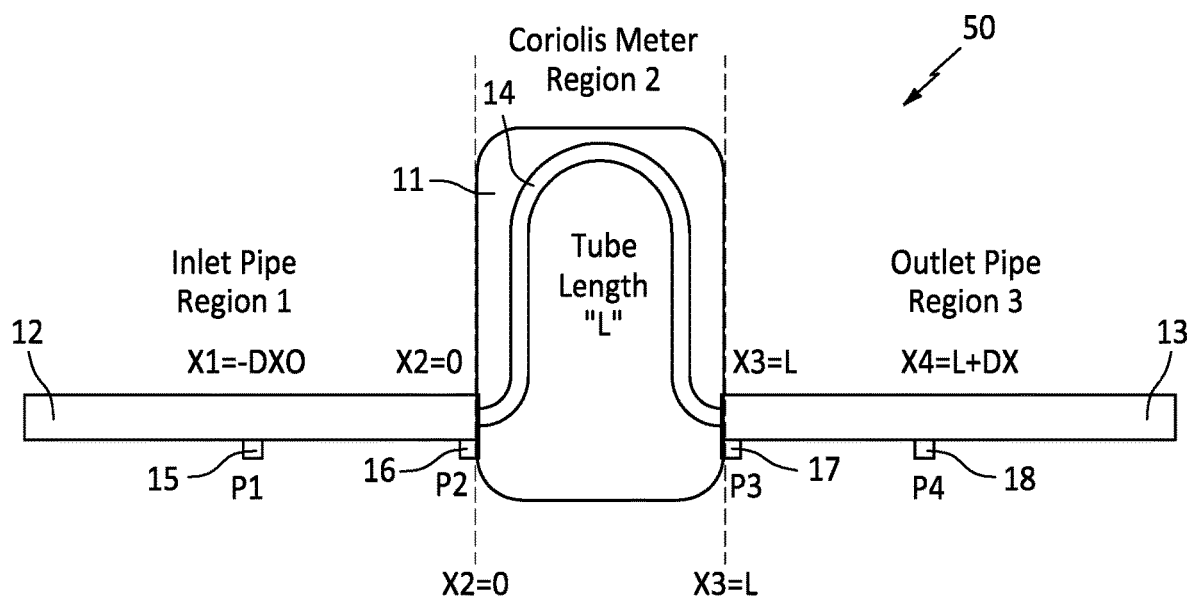
FIG. 5 is a schematic diagram of a system for determining the sound speed of a process fluid in a piping network in accordance with the present disclosure.

Referring to FIG. 5, there is shown a schematic of a fluid flow measuring system including a fluid measurement device in the form of a sound speed augmented Coriolis meter 50. In this implementation, sound speed augmented Coriolis meter 50 includes similar configuration to that disclosed in FIG. 1 having a Coriolis meter 11 installed in a piping network including an inlet pipe 12 and an outlet pipe 13. Inlet pipe 12 is shown as including inlet pressure transducers 15, 16. Outlet pipe 13 is shown as including outlet pressure transducers 17, 18. In the implementation shown in FIG. 5, pressure transducers 16, 17 are effectively positioned at the interface of the piping and the flow tubes 14. In this implementation pressure transducer 16 is positioned at $X_2$ which is some distance where X=0 and pressure transducer 15 is positioned at $X_1$ which can be a distance of D from X=0. Similarly, pressure transducer 17 is positioned at $X_3$ wherein X=L and pressure transducer 18 is positioned at $X_4$ which can be a distance of D from X=L. The simulation of sound speed augmented Coriolis meter 50 is best seen with reference to FIG. 6 which shows graphical representation 60 of the normalized power from the output of several array combinations involving pressure transducers 15-18 of FIG. 5 with the cross sectional area of the of flow tubes 14 equal to 60% of the cross sectional area of inlet pipe 12 and of outlet pipe 13. In this implementation, the normalized power for each speed of sound traveling in each direction is added, and the optimization provides an indication of the best of speed of sound, independent of direction. As indicated, the normalized power from Array23 is shown to be comparable to that of Array1234 and Array123, demonstrating analytically that the process fluid speed of sound can be determined utilizing the output of two pressure sensors installed at or near the flanges of a Coriolis meter, with the actual transducers installed either outboard or inboard of the flanges (FIGS. 8, 9).

Figure 7:
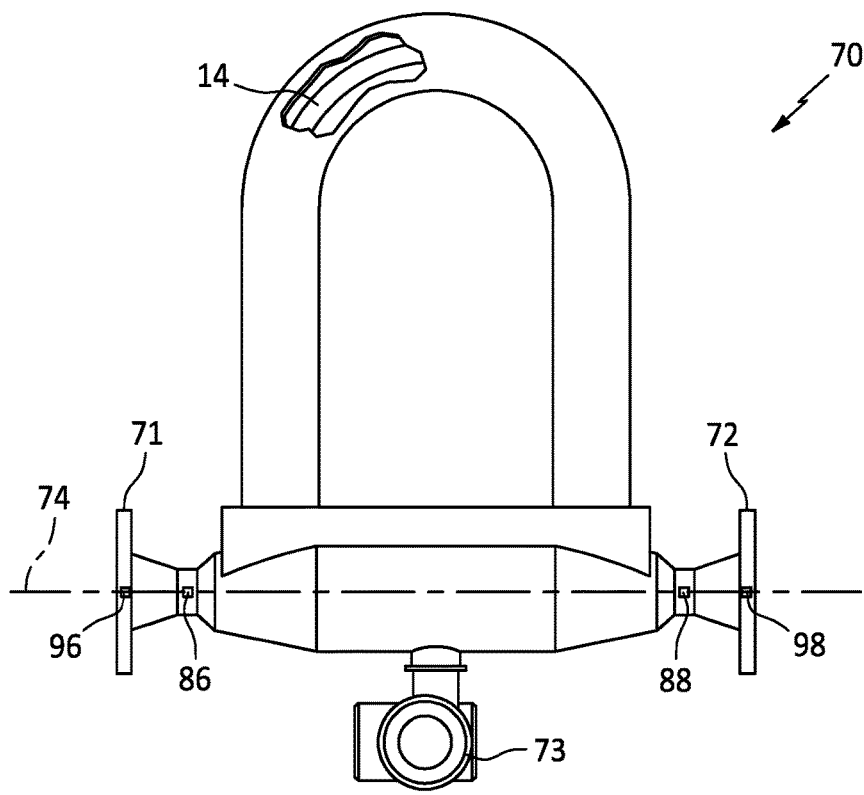
FIG. 7 is a side view in partial section of a sound speed augmented Coriolis meter in accordance with the present disclosure.

Referring to FIG. 7, there is shown a notional schematic of sound speed augmented Coriolis meter 70. As shown, flow tubes 14 are exposed for illustrative purposes. Coriolis meter 70 includes inlet flange 71, outlet flange 72 and transmitter 73. Inlet flange 71 is configured to be coupled to inlet pipe 12 (FIG. 1) and outlet flange 72 is configured to be coupled to outlet pipe 13 (FIG. 1). Transmitter 73 includes a microprocessor, software and communication screens and ports. Also shown in the figure is centerline 74 drawn through the center of inlet flange 71 and outlet flange 72. In operation, process fluid enters Coriolis meter 70 though inlet flange 71, flow through a flow splitter, and is directed to flow tubes 14 and exits the Coriolis meter through outlet flange 72, after emerging from the flow tubes and being recombined by flowing effectively in reverse through a symmetric flow splitter. As disclosed herein above, the ability the provide a process fluid speed of sound measurement utilizing only two pressure transducers near the inlet and outlet of a Coriolis meter provides a framework for cost-effective means to implement speed of sound augmented Coriolis meters on both a retrofit basis on existing Coriolis meters and by integration of this approach in the design and manufacturing of future Coriolis meters.

Figure 6:
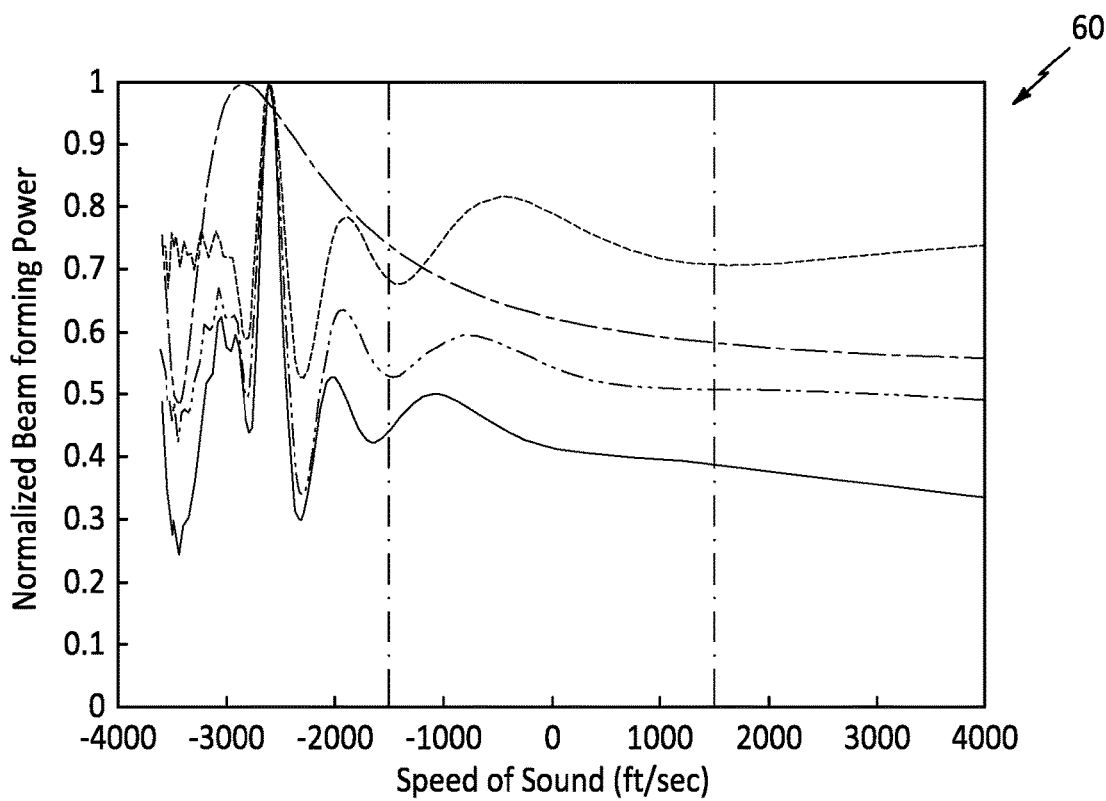
FIG. 6 is a graphical representation of a simulation of the determination of the sound speed of a process fluid in a piping network in accordance with the present disclosure.
Figure 8:
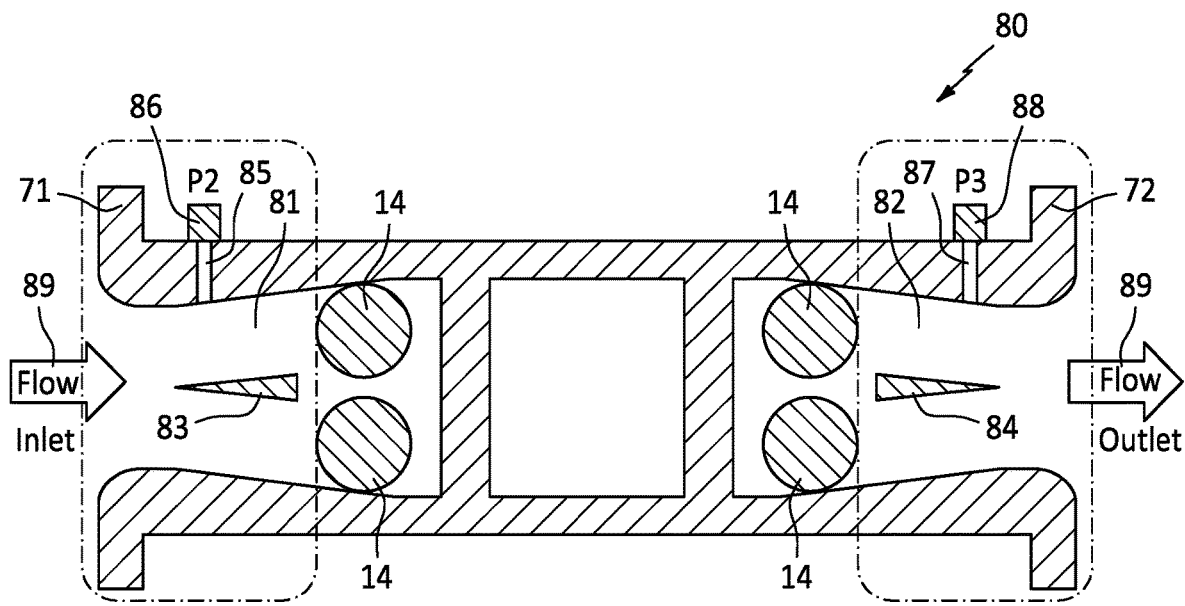
FIG. 8 is a cross section of a sound speed augmented Coriolis meter of FIG. 7 from a cutline taken along its centerline in accordance with the present disclosure.

Referring next to FIG. 8, there is shown a cross section of sound speed augmented Coriolis meter 80 from a cutline taken along centerline 74 (FIG. 7). It is known that dual tube Coriolis meters typically have flow splitters immediately upstream and downstream of the flow tubes. Sound speed augmented Coriolis meter 80 includes inlet flange 71, outlet flange 72, an inlet flow region 81 and an outlet flow region 72. Inlet flow region 81 comprises an inlet throat and defines a region within the Coriolis meter and includes inlet splitter 83 positioned upstream of flow tubes 14 for flow 89 (i.e. from a single inlet pipe 12) to be is "split" into the two flow tubes 14. Outlet region 82 comprises an outlet throat defines a region within the Coriolis meter having an outlet region cross sectional area and includes outlet splitter 84 positioned downstream of flow tubes 14 to transition flow 89 from the flow tubes into the outlet flange 72 into a unitary flow steam (and into an outlet pipe 13). The flow splitter region is typically contained within a dual tube Coriolis meter 11. Sound speed augmented Coriolis meter 80 includes an inlet throat pressure port 85 that penetrates the wall of the Coriolis meter near inlet flange 71 to access the flow area and further includes pressure transducer 86 positioned in fluid communication with the pressure port and configured to provide an acoustic pressure signal associated with process fluid 89 within the inlet splitter region 81. Similarly, sound speed augmented Coriolis meter 80 can include an outlet throat pressure port 87 that penetrates the wall of the Coriolis meter near outlet flange 72 to access the flow area and further includes pressure transducer 88 positioned in fluid communication with the pressure port and configured to provide an acoustic pressure signal associated with process fluid 89 within the outlet splitter region 82. In operation, pressure transducers 86, 88 are configured to produce signals indicative of the unsteady acoustic pressures of process fluid 89. As disclosed herein above, flow tubes 14 are of sufficient length such that afore-disclosed beamforming algorithms can provide the ability to determine the speed of the process fluid flow 89 as it travels through sound speed augmented Coriolis meter 80 utilizing passive listening techniques. In such a configuration, transducers 86, 88 comprise Array23, an example of the results from which are shown in FIG. 6 and can produce comparable process fluid speed of sound utilizing the output of two pressure transducers inboard of the flanges of a Coriolis meter. Adding pressure transducers either outboard of the flow splitters 83, 84, or inboard of the flow splitters, or on one of the flow tubes 14 near its mounting points are all methods of the present disclosure to obtain an acoustic pressure measurement without modifying the actively vibrating section of the Coriolis flow tubes. It is within the scope of the present disclosure that the two pressure transducers can also be installed within the inlet pipe 12 and outlet pipe 13 (FIG. 5) in fluid communication with the Coriolis meter to retrofit an existing Coriolis meter to incorporate a process fluid speed of sound measurement.

Figure 9:
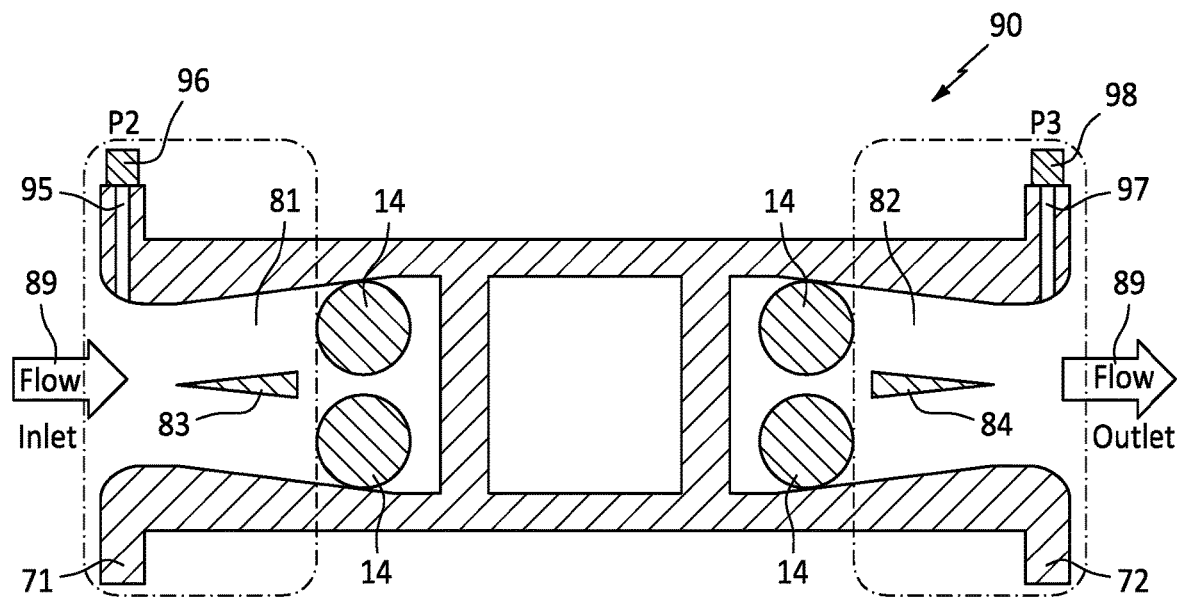
FIG. 9 is a cross section of sound speed augmented Coriolis meter of FIG. 7 from a cutline taken along its centerline in accordance with the present disclosure.

Referring to FIG. 9, there is shown a cross section of an implementation of sound speed augmented Coriolis meter 90 from a cutline taken along centerline 74 (FIG. 7). Similar to that shown in FIG. 8, sound speed augmented Coriolis meter 90 includes inlet flange 71, outlet flange 72, an inlet flow region 81 and an outlet flow region 72. Inlet flow region 82 defines a control volume within the Coriolis meter and includes inlet splitter 82 positioned upstream of flow tubes 14. Outlet region 82 defines a control volume within the Coriolis meter and includes outlet splitter 84 positioned downstream of flow tubes 14 which the flow from the two flow tubes is merged and can supply a single outlet pipe 13. The flow splitter region is typically contained within a dual tube Coriolis meter 11. Sound speed augmented Coriolis meter 90 includes an inlet flange pressure port 95 that is positioned in inlet flange 71 penetrates the to access the flow area and further includes pressure transducer 96 positioned in fluid communication with the pressure port and configured to provide an acoustic pressure signal associated with flow 89 within the inlet splitter region 81. Similarly, sound speed augmented Coriolis meter 90 can include an outlet flange pressure port 97 positioned in outlet flange 72 that penetrates the flange to access the flow area and further includes pressure transducer 98 positioned in fluid communication with the pressure port and configured to provide an acoustic pressure signal associated with flow 89 within the outlet splitter region 82. In operation, pressure transducers 96, 98 are configured to produce signals indicative of the unsteady acoustic pressures of flow 89 as it travels through flow tubes 14. As disclosed herein above, flow tubes 14 are of sufficient length to provide the frequency resolution to use the afore-disclosed beamforming algorithms to determine the speed of the process fluid flow 89 as it travels through sound speed augmented Coriolis meter 90. In such a configuration, transducers 96, 98 comprise Array23 in FIG. 6 and can produce comparable process fluid speed of sound utilizing the output of two pressure transducers inboard of the flanges of a Coriolis meter.

Note also that, as part of the present disclosure, pressure transducers can be incorporated in into a port within a coupling device such as a modified "blank" flange. As used herein, a blank flange is a disc of suitable material to be incorporated into a piping network. A modified blank disc include a fluid conveying section machined into the disc and suitable mounting holes machined into the disc such that the modified blank disc can be inserted between the flanges of a piping network and another device such as a Coriolis meter. For instance, a modified blank flange can be positioned at the inlet and the outlet of the Coriolis meter. The modified blank flange can include a pressure port machined through a side of the disc and penetrating the fluid conveying section. The pressure port can include a suitable female threaded portion to accommodate the threaded insertion of a pressure transducer having a standard male national pipe thread portion as disclosed herein above. Such modified blank flanges including pressure transducers can be installed near the inlet and outlet of an Coriolis meter with requiring any modifications to either the existing piping or the Coriolis meter other than providing the required increase in axial space to accommodate the thickness of the additional modified blank flange.

Figure 10:
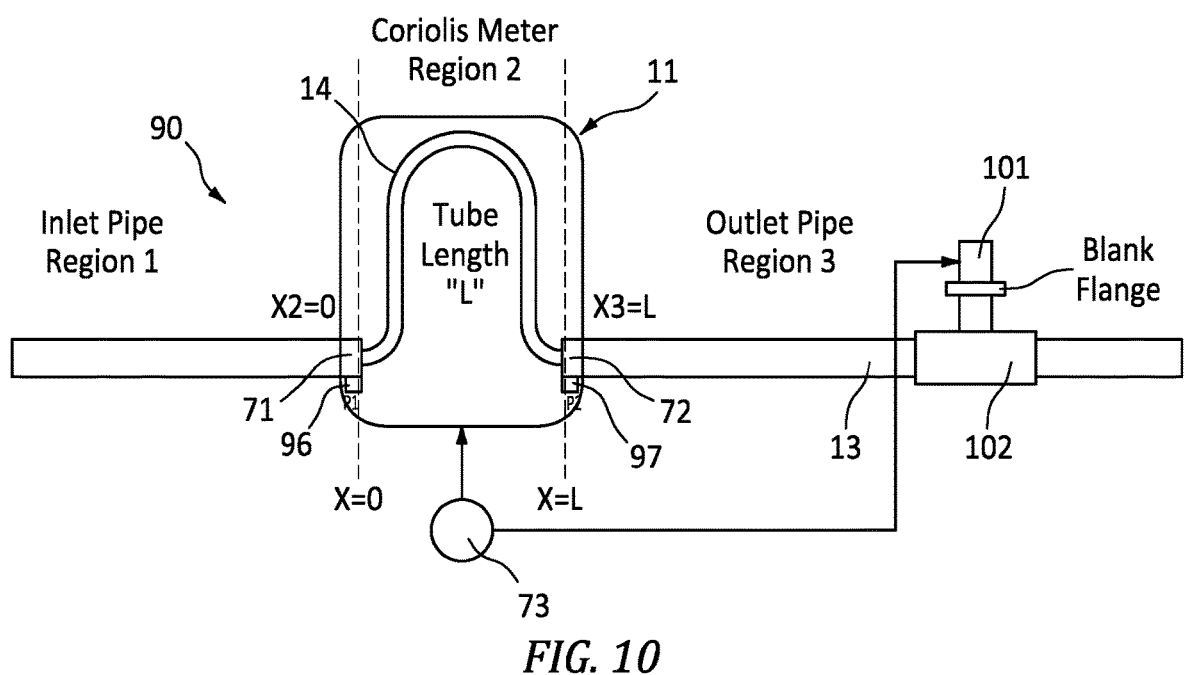
FIG. 10 is a schematic diagram of a system for determining the sound speed of a process fluid in a piping network including an active acoustic source in accordance with the present disclosure.

In some industrial applications of sound speed augmented Coriolis meter the acoustics may not be sufficient from which to determine the process fluid speed of sound using an array of 2 pressure transducers embedded into the flange regions of a Coriolis meter. This uncertainty in the acoustic environment of the piping network introduces uncertainty in any product whose accuracy and performance is predicated on the ability the device to measure the process fluid sound speed. In addition, since characterizing the acoustics of a piping network before the specification of a flow instrumentation is often imprecise and impractical, any lack of sufficient acoustic environment would often not be discovered until after a Coriolis meter was installed, at which time, any modifications required the improve the acoustic environment could be cost intensive. Referring next to FIG. 10, there is shown a schematic of an implementation of the current disclosure which includes sound speed augmented Coriolis meter 90 (FIG. 9) with pressure transducer 96 positioned in inlet flange 71 and pressure transducer 98 positioned in outlet 71 of the Coriolis meter 11 with the flow tubes 14 of the Coriolis meter having a materially different Cross sectional area than that of the cross section of piping network where the sensors are installed. This particular implementation of sound speed augmented Coriolis meter 90 includes an active acoustic source in the form of vibration source 101 mounted in outlet pipe 13 via a tee fitting 102. Vibration source 101, which can comprise a voice coil, is useful in instances where the ambient acoustics in the piping system is insufficient to use the beamforming techniques disclosed herein to determine the speed of sound of the process fluid. Vibration source 101 produces acoustic waves in outlet pipe 13 that travel to sound speed augmented Coriolis meter 90. Although shown in outlet pipe 13, vibration source 101 can be mounted to portion of the piping system that is in fluid communication with sound speed augmented Coriolis meter 90. Sound speed augmented Coriolis meter 90 also includes transmitter 73 includes a microprocessor, software and communication screens and ports that controls and monitors all actuators and sensors for the speed of sound augmented Coriolis meter.

It has been shown, as part of the current disclosure, that inventively integrating two acoustic measurements on or near either side of a Coriolis meter can provide a process fluid sound speed measurement. The effectiveness of this approach will depend on the level of propagating, one-dimensional, acoustics within the piping network in which the Coriolis meter is installed and the presence of other types of coherent disturbances that may impair the ability of the two component sensor array to discern the process fluid sound speed. Limiting the measurement of the acoustic field to two physical locations near or at the inlet and the outlet of the flow tubes has many practical advantages for a Coriolis meter. The regions near the flanges 71, 72 are designed to structurally isolate the relatively flexible, vibrating flow tubes 14 from vibrations within the process piping system. As such, the flow conduit within the regions of a Coriolis meter near the flanges are typically thick walled conduits and are well suited to accept the installation of pressure transducers disclosed herein. Also, for bent tube Coriolis meters, the two measurements (i.e. pressure transducers) are separated by a unwrapped length "L" of the flow tubes 14. In this particular case, L is the interest length or the length of region of the piping network within which the speed of sound of the process fluid is sought. This length can be considerable, approximately 4-6 feet for many commercial bent tube 2 inch and 3 inch Coriolis meters. The greater the distance between the two sensing locations, the larger the array aperture. Typically, increasing array aperture improves the performance of the array in determining process fluid sound speed. It has been discovered that for many industrial applications, the acoustic environment will be adequate for an array of two pressure transducers to determine the process fluid sound speed.

Figure 11:
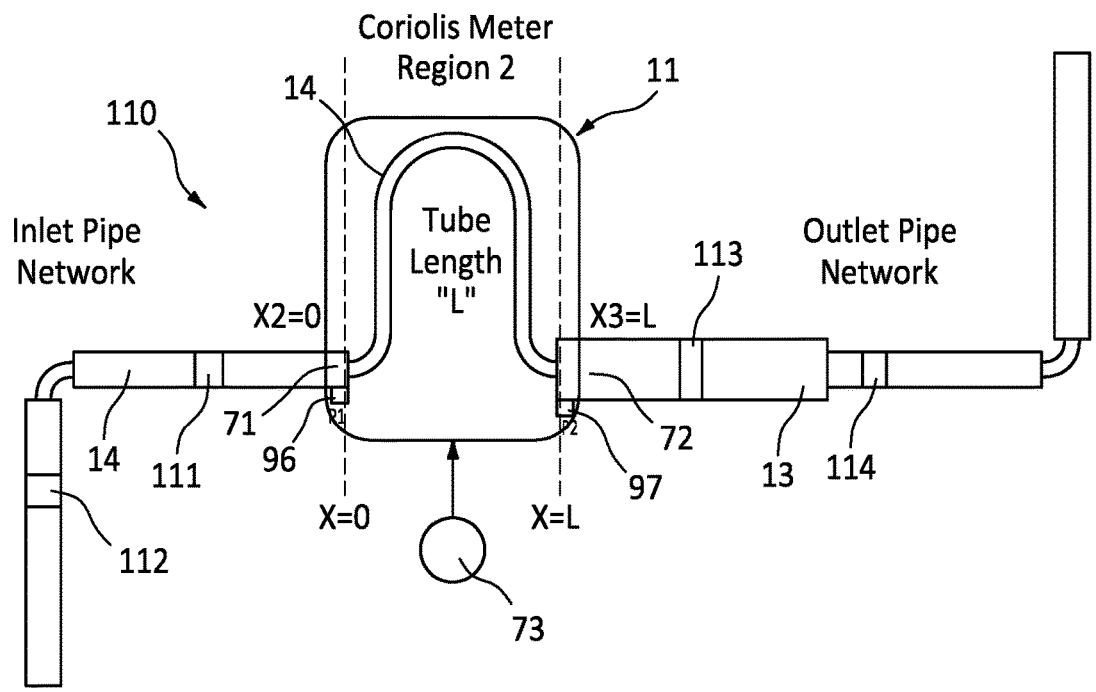
FIG. 11 is a schematic diagram of a system for determining the sound speed of a process fluid in a piping network in accordance with the present disclosure.

FIG. 11 shows a schematic of the notional placement of auxiliary pressure sensors used to augment a process fluid sound speed measurement on a speed of sound augmented Coriolis meter 110. Speed of sound augmented Coriolis meter 110 is similar to that disclosed in FIG. 10 with a pair of pressure transducers 96, 97 mounted in the flanges 71, 72 of Coriolis meter 11. Speed of sound augmented Coriolis meter 110 includes optional auxiliary pressure sensors 111, 112 positioned on inlet pipe 12 and optional auxiliary pressure sensors 113, 114 positioned on outlet pipe 13. As shown, the additional sensor or sensors can be located in the piping network upstream and downstream of the Coriolis meter. The sensors should be located in regions of the piping network for which the process fluid has characteristics similar to that of the process fluid within the Coriolis flow tubes 14, i.e. similar, but not identical, pressure and gas void fraction etc. The sensors 111-114 could be applied to outside of inlet pipe 12 and/or outlet pipe 13 (i.e. clamp-on style sensors) or they can comprise ported pressure transducers as disclosed herein above. In certain implementations of speed of sound augmented Coriolis meter 110 pressure transducers 96, 97 comprise ported pressure sensors positioned in the body of the Coriolis meter 11, and strain-based sensors can be utilized for any of auxiliary pressure sensors. This embodiment enables a standard speed of sound augmented Coriolis meter configuration which utilizes two embedded ported pressure sensors within the Coriolis meter. The Coriolis meter would be designed to accommodate additional auxiliary sensors, if needed, by including any necessary ports to plug-in auxiliary sensors and the necessary electronics to detect and process additional acoustic sensors.

Some implementations disclose herein can advantageously utilize dissimilar acoustic sensors, including both ported pressure sensors and clamp-on strain-based sensors, to provide an improved measurement of process fluid sound speed. An example of a ported pressure sensor comprises a piezoelectric pressure sensor commercially available from PCB Piezoelectronics. Such piezoelectric pressure sensors can have a standard male national pipe thread portion that can be threadably installed into a mating female thread in the Coriolis meter or piping network. The clamp-on strain based sensors can comprise a polyvinylidene difluoride (PVDF) or similar piezoelectric film and can comprise a SONARtrac flow meter commercially available from CiDRA. The ported pressure sensors and clamp-on strain-based sensors can output a sensor signal and have proportional response characteristics to acoustic pressures, however they have dissimilar response characteristics in terms of their response to vortical pressure disturbances and structural vibrations. For example, ported pressure transducer can be designed to be vibration isolated, minimizing the sensitivity of the pressure sensor to mechanical vibrations. Also, the diameter and depth of the pressure port and pressure sensor can influence the amount of vortical pressure variations measured by a ported pressure sensor based on the ratio of the length scale of coherent vortical disturbances to the length scale of the pressure port. Strain based sensors typically respond to any type of strain within the pipe, whether it is from long wave length acoustic pressure variations, or flexural, or torsional, or compressive structural waves. Often the ability of arrays of strain-based pressure sensors to measure a process fluid sound speed is degraded by coherent structural waves. Typically, strains levels associated with structural vibration far exceed strain levels generated with conduit associated with acoustic pressure, often requiring a large number of strain-based sensors to identify the propagation speed of acoustic waves in the presence of structural vibration.

Since the objective of the acoustic array is to determine the speed at which coherent acoustic wave are propagating through the Coriolis flow tubes and inlet and outlet piping regions, utilizing an array which contains both ported pressure transducers and strain-based clamp-on sensors is particularly advantageous, enabling the use of a limited number of clamp-on strain based sensors for adaptability and convenience when needed, and, minimizing the impact of structural vibrations on the acoustic measurement by also utilizing the relatively vibration insensitive port pressure sensors within the same array.

Experimental Set-Up

Figure 12:
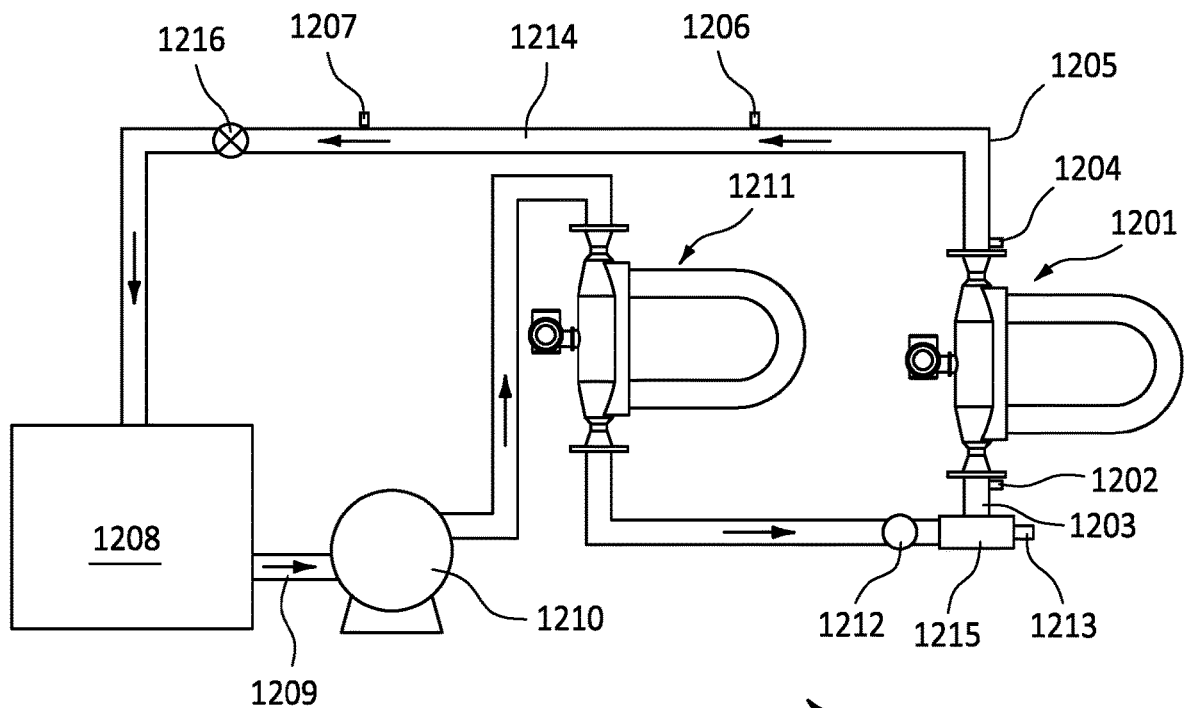
FIG. 12 is a schematic diagram of a test up of a piping network including a sound speed augmented Coriolis meter in accordance with the present disclosure.

With reference to FIG. 12, an experimental facility 120 was constructed to demonstrate the ability of implementations of a sound speed augmented Coriolis meter of the present disclosure to interpret the output of an array of unsteady pressure sensors which spans the flow tubes of a Coriolis meter in terms of the process fluid speed of sound. As will be disclosed in detail herein below, this speed of sound measurement was then utilized to characterize and corrected for the effects of decoupling on density measurement, mass flow measurement and volumetric flow rate of a Coriolis meter operating in bubbly mixtures.

FIG. 12 shows a schematic of the Coriolis test facility 1200 showing a flag mounted, vertically-upward flowing Coriolis meter under-test 1201 with acoustic pressure transducer 1202 mounted in a port in inlet pipe 1203 and acoustic pressure transducer 1204 mounted in a port in outlet tube 1205 the location of pressure transducers located directly upstream and directly downstream of the Coriolis meter under test. Coriolis test facility 1200 further includes acoustic pressure transducer 1206 and acoustic pressure transducer 1207 mounted in ports in return pipe 1214. The intent of the experimental set-up of Coriolis test facility 1200 was to demonstrate the ability to measure the speed of sound of a process fluid utilizing an array of sensors that spans the Coriolis flow tubes as disclosed herein above. It should be noted that the positioning of the four time-resolved acoustic pressure sensors 1202, 1204, 1206, 1207 enabled several array configurations to be evaluated. As will be disclosed in more detail herein after, these configurations include:

Array 1: Pressure transducers 1202 and 1204 only. This configuration is advantageous in that it demonstrates the ability to measure the process fluid sound speed with two sensors located proximate the upstream flange and downstream flange connections of a Coriolis meter. It should be appreciated by those skilled in the art that there is no fundamental difference between a pressure sensor located within a few inches upstream or downstream of a flange, or located at the flange from an acoustic array functionally perspective This Array 1 configuration effectively serves to demonstrate a configuration in which the pressure transducers 1202 and 1204 are installed within the body of the Coriolis meter itself, near the flanges or at a location separate from the flow tubes.

Array 2: Pressure transducers 1202, 1204 and 1206 effectively demonstrates configurations in which two sensors are built into the Coriolis meter, and one additional sensor is placed remotely from the body of the Coriolis meter. As disclosed with respect to speed of sound augmented Coriolis meter 110 (FIG. 11) this implementation would be advantageous for a Coriolis meter that was built with two embedded pressure sensors, with an option to connect either one or more additional sensors to improve the ability to measure the process fluid sound speed.

Array 3: Pressure transducers 1204, 1206 and 1207 provides a reference sound speed measurement which is measured from an array of pressure transducers installed on a single conduit (return pipe 1214 directly coupled to outlet pipe 1205) to serve as a reference sound speed measurement. It should be noted that the process fluid within this region downstream of the Coriolis meter will be a lower pressure than the process fluid within the Coriolis flow tubes due to the pressure drop associated with the process fluid flowing through the flow tubes 14.

Array 4: Pressure transducers 1202, 1204, 1206 and 1207 represents the entire array of pressure transducers shown in the figure.

Referring still to FIG. 12, the experimental flow loop of Coriolis test facility 1200 was used to characterize speed of sound augmented Coriolis meter under-test 1201 operating on a bubbly fluid of water. Coriolis test facility 1200 facility utilizes a large water tank 1208 (125 gallon), a supply pipe 1209 emerging from the tank and feeding a water pump 1210 (2 horsepower single speed pump), a reference Coriolis meter 1211, a turbine meter 1212, an air injecting gas sparger 1213 located in the vertical piping section of inlet pipe 1203 below the Coriolis meter under test 1201. Coriolis test facility 1200 further includes flag-mounted Coriolis meter under test 1201 with flow vertically upwards s indicated by the flow arrows. It is so-called flag mounted, as is known in the industry, in that the flow tubes 14 resemble a flag and helps to minimize gas hold up within the flow tubes when operating on bubbly liquids. Inlet pipe 1203, outlet tube 1205 and return line 1214 comprise schedule 80 steel piping with the array of pressure sensors 1202, 1204, 1206, 1207, having a nominal spacing of 54 inches. As disclosed above, the first two sensors of the array, 1202, 1204, are located in ports in the 2 inch schedule 80 piping in close proximity to the inlet and outlet of the Coriolis meter under test 1201.

The Coriolis test facility 1200 was set-up for a continuous flow of water, with air injected by air injecting gas sparger 1213 to create bubbly flow upstream of the Coriolis under test 1201. The air bubbles within the bubbly flow are separated by gravity in the water tank 1208 after exiting return line 1214, and the air is vented to atmosphere. Water is drawn from the supply pipe 1209 from water tank 1208 by a constant speed, two horsepower pump 1210. The water tank 1208 was sized to ensure that it would serve as an effective separator for the air injected in the test section, with a volume to provide sufficient residence time within the tank to effectively separate the injected air from the water.

After exiting pump 1210, the is water directed to the test section and flows vertically downward through a reference Coriolis meter 1211, and then through turbine meter 1212, and then is routed vertically upwards through a blind tee

1215 and continues to flow toward the Coriolis meter under test 1201. Air can be injection at this point, through a sparger 1213 inserted through a blind flange on the blind tee 1215. The right angled sparger 1213 injects the air (from an air source) into the water through its tip region, located in the vertically upward flowing section immediately upstream of the Coriolis meter. The bubbly mixture simulating process fluid then enters a 2 inch schedule 80 inlet pipe 1203 upstream of the Coriolis meter under test 1201, passes through the Coriolis meter under test, into more 2 inch schedule 80 piping of outlet pipe 1205. Return pipe 1214 and outlet pipe 1205 comprise approximately 10 feet of 2 inch schedule 80 piping before which further includes manual back pressure valve 1216 which can be used to adjust the flow and pressure in the test section. Once the bubbly flow passes back pressure valve 1216, the bubbly flow is returned to water tank 1208 at atmospheric conditions.

Test and Analysis Procedure

Tests were run using data collection equipment with Coriolis test facility 1200 operating at a nominally constant pump speed and valve settings with the data sets recorded for discrete levels of air injection. Air injection rates were monitored utilizing a variable area flow meter with a metering valve (not shown). For each air injection level, output of the reference Coriolis meter 1211 was recorded via a 4-20 mAmp output, and the mass flow and density of the Coriolis under-test was recorded via a Modbus interface to generate time-stamped log files. Additionally, the time-resolved pressure transducers 1202, 1204, 1206, 1207 were recorded at a rate 4000 Hz for 2 minutes in time-stamped data files.

After data was recorded over a range of injection levels corresponding to gas void fractions ranging from –0% to 4%, the data from the unsteady pressure sensors was processed utilizing beam forming algorithms to determine the process fluid speed of sound, stored in time-stamped log files. It should be noted, as disclosed above, that various array configurations were used to determine the process fluid sound speed.

Time-averaged values for the process fluid sound speed and Coriolis data were determined for each set point corresponding to nominally constant conditions within Coriolis test facility 1200. As will be disclosed in more detail herein after, the sound speed determined from the array configuration containing only the first two sensors was utilized in an optimization procedure to characterize and correct for the effects of entrained air on the Coriolis meter under-test 1201.

Process Fluid Sound Speed Measurement

The process fluid sound is speed determined utilizing beam forming techniques disclosed herein above in which the power associated with projecting steering vectors, determined using the array spacing and trial process fluid sound speeds, on to the cross-spectral-density matrix is maximized to determine an optimized process fluid sound speed.

Figure 13:
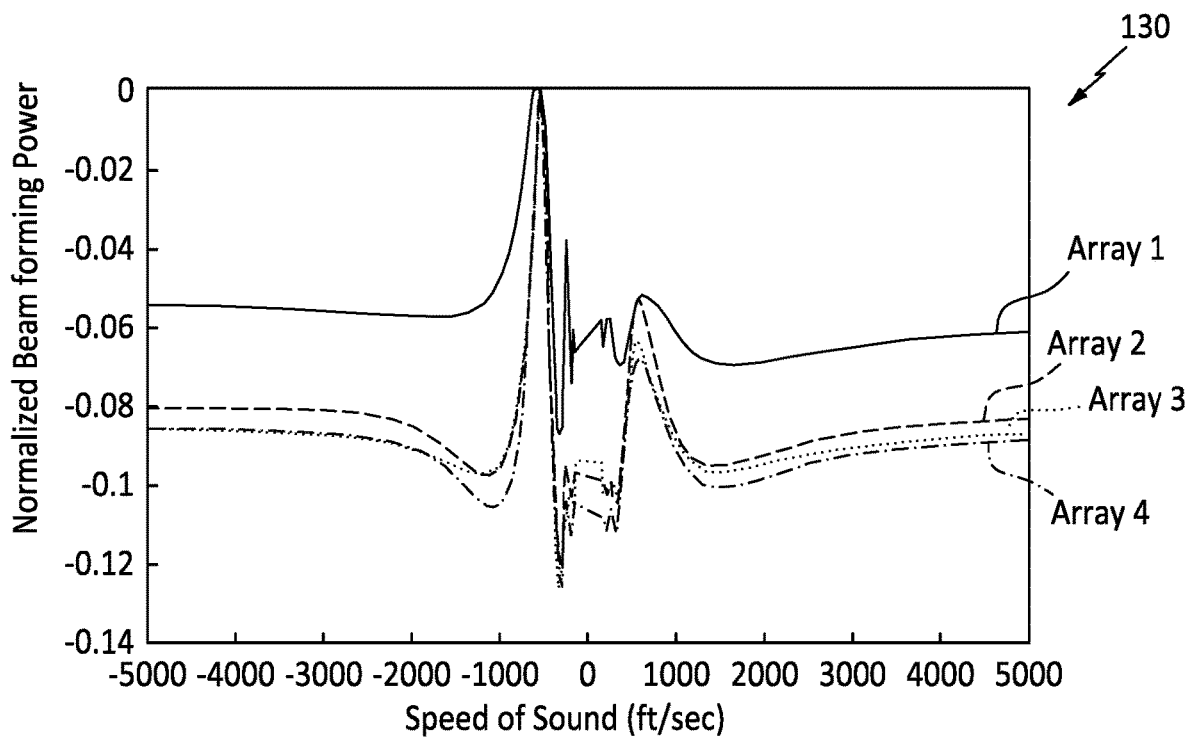
FIG. 13 is graphical representation of a beam forming power optimization function meter in accordance with the present disclosure.

FIG. 13 shows a graphical representation 130 of an example of a beam forming power optimization function generated from data from various configurations of an array of sensors from Coriolis test facility 1200 measuring the speed of sound of a bubbly mixture flowing through a Coriolis meter under-test 1201. For this plot, positive sound speed indicates sound traveling in the direction of the flow (in the direction of the flow arrows) and negative sound speeds indicated sound traveling against the direction of the flow. The optimized values from each of the four array configurations processed Array 1, Array 2, Array 3 and Array 4. As shown, the optimized process fluid sound speeds are quite consistent with each other, indicating a high level of functional equivalence among the various array configurations for these conditions.

Figure 14:
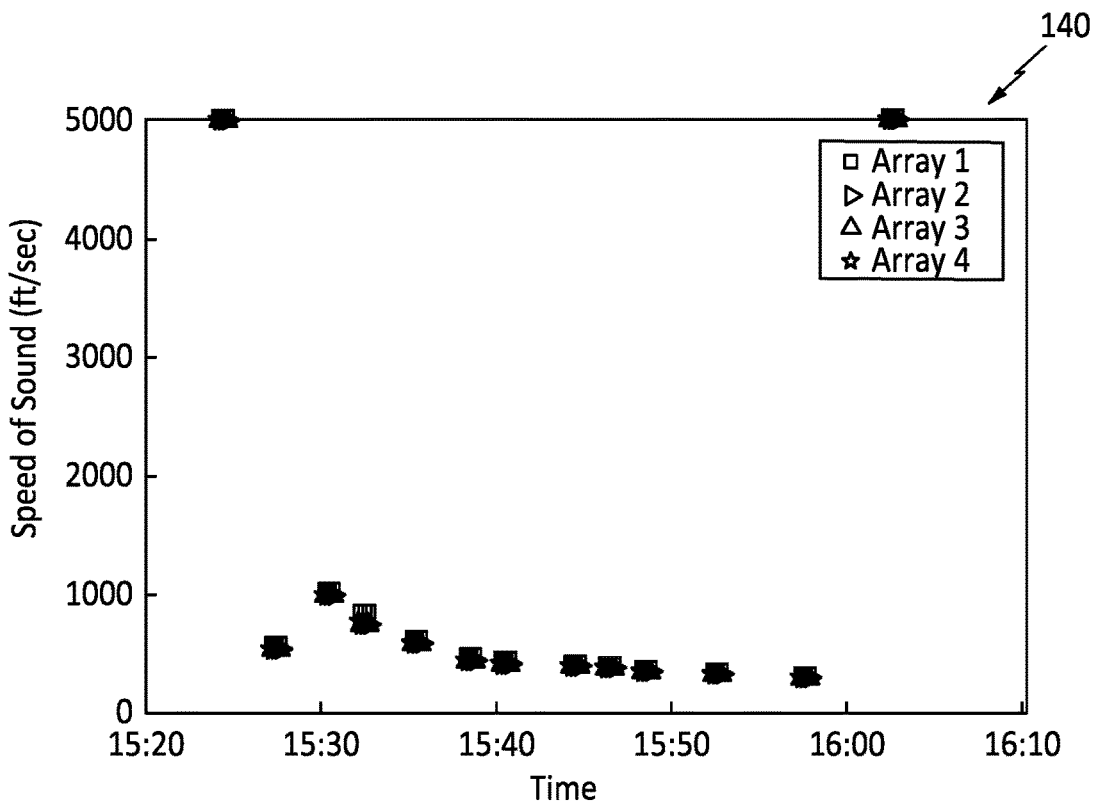
FIG. 14 is a graphical representation of a process fluid sound speed of a piping network in accordance with the present disclosure.

FIG. 14 shows a graphical representation 140 for the process fluid sound speed determined at nominally constant process fluid rate, wherein the process fluid is air entrained water, with varying gas injection rates utilizing the various array configurations within the Coriolis test facility 1200 for Coriolis meter under-test 1201. As shown, the speed of sound determined for each of the array configurations in broadly consistent. Of particular importance is that the data shows a functional equivalence between a sound speed measure utilizing Array 3 with sensors located on a section of nominally-constant cross-sectional-area piping (namely outlet pipe 1205 and return line 1214), and that determined utilizing Array 1 utilizing sensors measured on either side of vibrating flow tubes 14 of Coriolis meter under test 1201 from sections of piping with significantly different cross-sectional-area than that of the Coriolis flow tubes 14.

The data presented in FIG. 14 also demonstrate the ability to utilize two sensors spanning Coriolis flow tubes in combination with one or more sensors located remotely from the Coriolis meter as set forth herein above.

Figure 15:
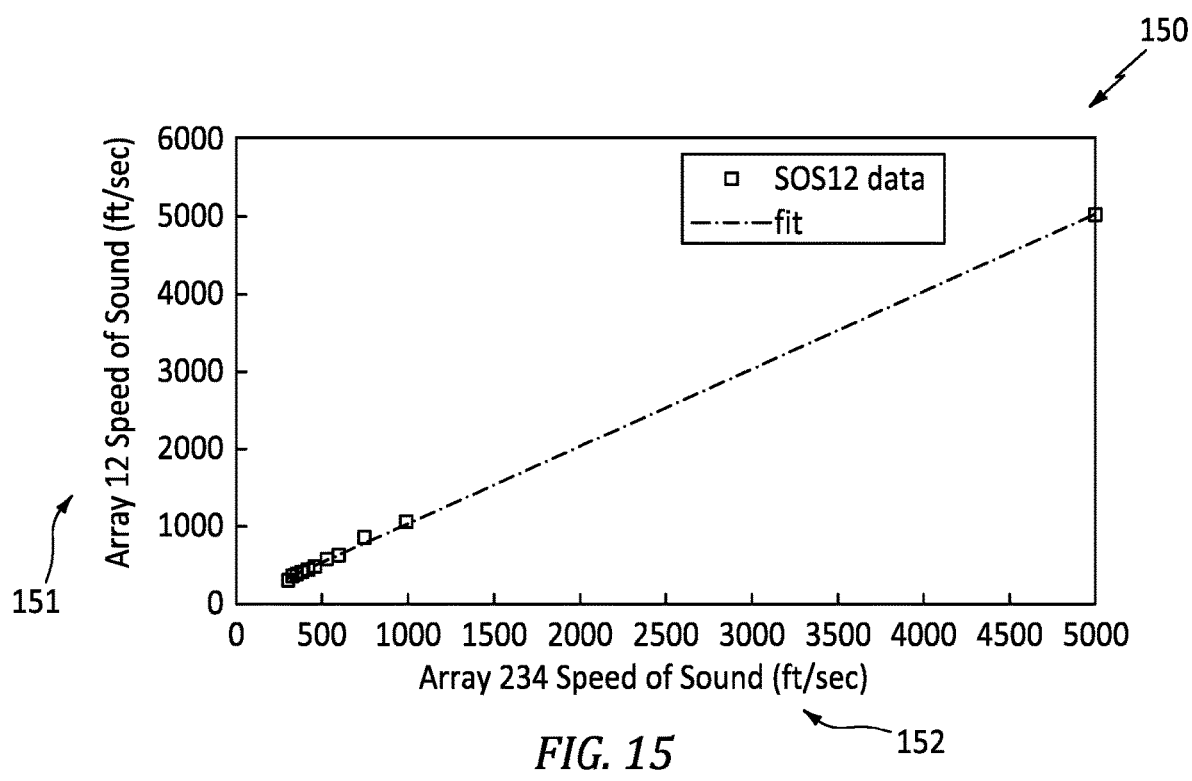
FIG. 15 is a graphical representation of a process fluid sound speed in a fluid conveying section using a two sensor array in accordance with the present disclosure.

FIG. 15 is a graphical representation 150 shows sound speed 151 measured utilizing Array 1, a two sensor array spanning speed of sound augmented Coriolis meter under-test 1201, compared to the sound speed 152 measured utilizing Array 3, a three sensor array located on a constant cross-sectional area section of piping away and immediately downstream of the speed of sound augmented Coriolis meter under-test. As shown, the sound speed measured from the two arrays are in good agreement.

Characterizing and Correcting for Errors on Coriolis meters operating on Bubbly fluids The sound speed measured from Array 1 was then utilized to characterize and to correct for the effects of entrained gas in water on speed of sound augmented Coriolis meter under-test 1201.

As disclosed in copending patent application Ser. No. 17/800,039, having filing date of 16 Aug. 2022 the disclosure of which is incorporated in its entirety, the speed of sound can be related to the gas void fraction of a mixture through Wood's equation which relates mixture sound speed and density to the phase fractions, density and sound speeds of the components. The elasticity of the conduit also enters into Wood's Equation, given below for a thin-walled, circular cross section conduit of outer diameter D and wall thickness of t:

$$\frac{1}{\rho_{mix} a_{mix}^2} = \sum_{i=1}^{N} \frac{\varphi_i}{\rho_i a_i^2} + \frac{D-t}{Et} \qquad \text{Equation 15}$$

Where mixture density is given by:

$$\rho_{mix} = \sum_{i=1}^{N} \varphi_i \rho_i \qquad \text{Equation 16}$$

If the process liquid density is not known, the determination of gas void fraction based on a measured sound speed and knowledge of the gas properties is not uniquely defined. Adding a process fluid density as measured by a Coriolis meter operating on the bubbly mixture enables an improved determination of both the process liquid density and the gas void fraction as described below:

For a bubbly liquid, Wood's equation can be expressed as follows:

$$\frac{1}{\rho_{mix} a_{mix}^2} = \frac{\alpha}{\rho_{gas} a_{gas}^2} + \frac{1-\alpha}{\rho_{liq} a_{liq}^2} + \frac{D-t}{Et} \quad \text{Equation 17}$$

Where the mixture density is given by:

$$\rho_{mix} = \alpha \rho_{gas} + (1-\alpha)\rho_{liq} \quad \text{Equation 18}$$

The effect of decoupling in Coriolis test facility 1201 was determined using the measured density and sound speed for the set of averaged values and by optimizing for the decoupling parameters in the following empirical model for effects of decoupling and compressibility on the density measured by a Coriolis meter operating on bubbly mixtures:

$$\rho_{meas} = \left(1 - k_{d_{eff}} \alpha + G_d (f_{red})^2\right) \rho_{liq} \quad \text{Equation 19}$$

Where:

$$k_{d_{eff}} = k_{d_1} + (3 - k_{d_1})(1 - e^{-\beta \alpha}) \quad \text{Equation 20}$$

$k_{d_1}$ is the effective decoupling constant for density, $\alpha$ is the gas void fraction, $\beta$ is the bubble coalescence parameter, $G_d$ is the compressibility constant for density, and $f_{red}$ is the reduced frequency, defined as:

$$f_{red} \equiv \frac{2\pi f_{tube}}{D \, a_{mix}} \quad \text{Equation 21}$$

An optimization was performed based on minimizing the difference of the measured densities and those predicted by the empirical model as function of $k_{d_1}$, $\beta$, and liquid density. The density compressibility parameter was set to be $G_d = 0.25$, and the reduced frequency for each point was directly calculated from the measured sound speed and Coriolis tube vibration frequency. The optimization of the density data assumes that the liquid density is sufficiently constant over a range of more than one data points.

If the liquid density is sufficiently well-known, the effective decoupling $k_{d_{eff}}$ can determined directly from a single density and sound speed measurement as follows:

$$k_{d_{eff}} = \frac{(\rho_{liq} - \rho_{measured} + G_d f_{red}^2)}{\alpha} \quad \text{Equation 21}$$

Figure 16:
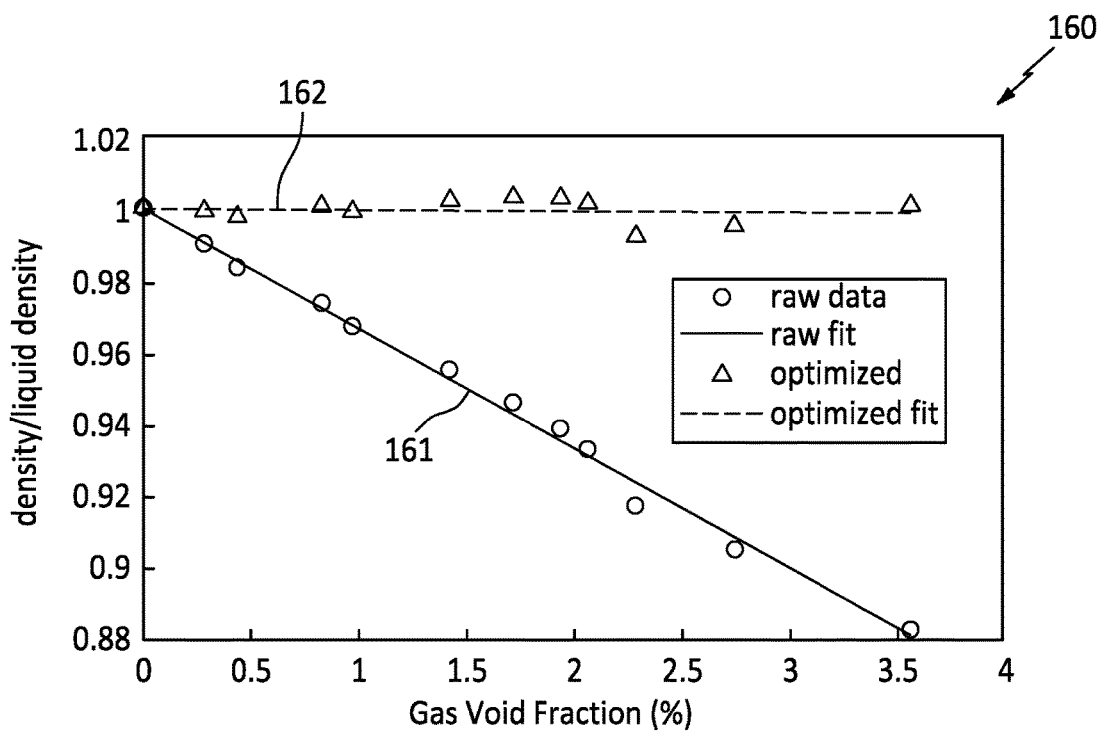
FIG. 16 is a graphical representation of a speed of sound augmented Coriolis meter in accordance with the present disclosure.

FIG. 16 is a graphical representation 160 of the raw measured density 161 and optimized liquid density 162 as a function of optimized gas void fraction based on the measured density from the speed of sound augmented Coriolis meter under-test 1201 and the process fluid sound speed determined from the two sensor array Array 1. The optimized decoupling constants are $k_{d_1} = 3.54$, with $\beta = 0.0$. The gas void was varied from 0 to 3.6%. Also shown in FIG. 16 is a linear fit between the raw measured density 161 and optimized liquid density 162. Assuming that the density measurement of a conventional Coriolis meter operating in a bubbly mixture of unknown gas void fraction is interpreted as the density of the liquid, and stipulating that the liquid density is independent of gas void fraction, a comparison of the slope of the raw density versus gas void fraction and the slope of the corrected liquid density versus gas void fraction (which is ideally zero) can be used as a measure of the effectiveness of the correction for the density measurement. For the raw measured density 161, is the slope of the measured density versus gas void fraction is −3.32, which is reduced to a slope of −0.04 for the optimized liquid density 162 for this data set. From the foregoing, it should be appreciated y those skilled in the art that the optimization techniques disclosed herein can provide corrections to measured parameters of a Coriolis meter including a corrected density and a corrected volumetric flow.

The mass flow measured by a conventional Coriolis meter operating in bubbly flows can be related to the actual mass flow of liquid as follows:

$$\dot{m}_{meas} = \left(1 - \frac{(k_{m_{eff}} - 1)}{1 - \alpha} \alpha + G_m (f_{red})^2\right) \dot{m}_{liquid} \quad \text{Equation 22}$$

Where $k_{m_{eff}}$ is the effective mass flow decoupling parameter.

The form of the errors in measured mass flow are similar to those of density in Equation 19. And, since the mechanisms which effect the density measurement of a conventional Coriolis meter in bubbly flows are similar to the mechanism that effect the mass flow measurement, it may be reasonable to assume that the density decoupling parameter is related to the mass flow decoupling parameter.

Figure 17:
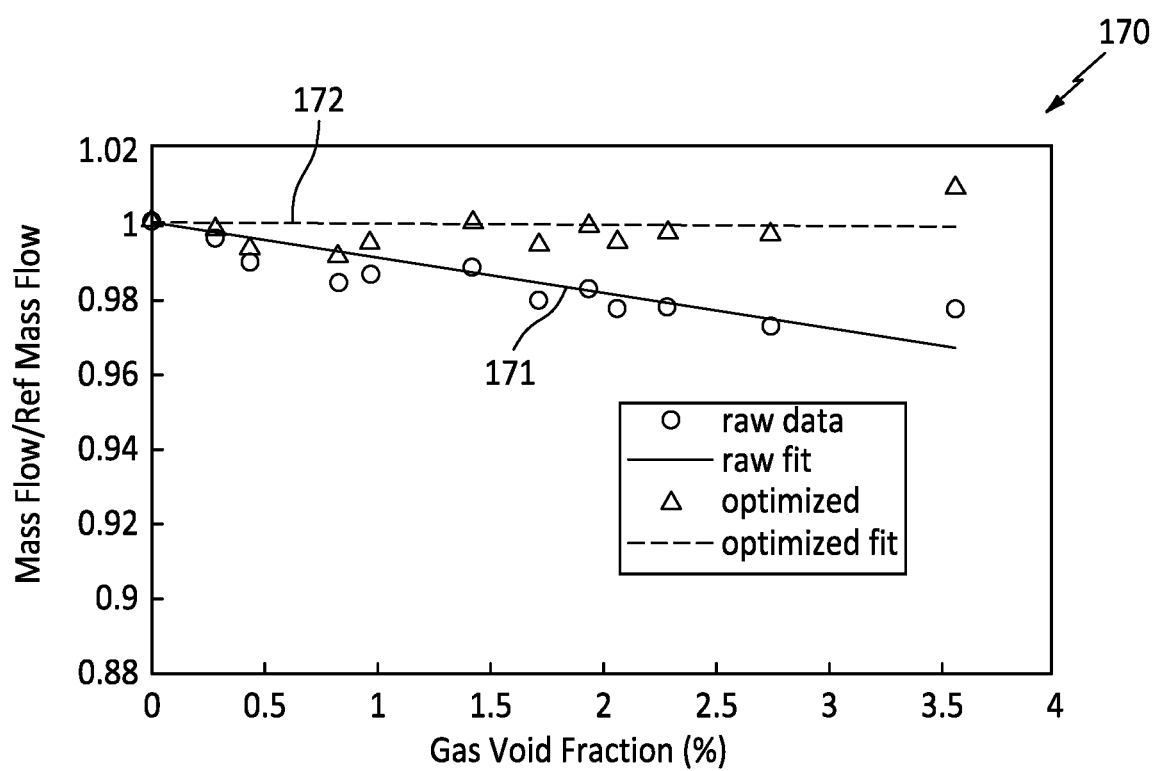
FIG. 17 is a graphical representation of a speed of sound augmented Coriolis meter in accordance with the present disclosure.

Referring to FIG. 17, there is shown a graphical representation 170 of the raw mass flow 171 and optimized mass flow 172 as a function of optimized gas void fraction shows Raw and Corrected Mass Flow, normalized by reference mass flow as a function of Optimized Gas Void Fraction.

For this model, the mass flow decoupling parameter was determined to be related to the density decoupling parameter as follows:

$$k_{m_{eff}} = 0.66 * k_{d_{eff}} \quad \text{Equation 23}$$

As shown, the raw errors in mass flow due to gas void fraction are less than the equivalent errors in density (FIG. 16). However, utilizing a proportional relationship between the density decoupling parameter and the mass flow decoupling parameter results in a reducing the slope of the mass flow versus gas void fraction from −0.93 for the raw measured mass flow to −0.05 for the corrected mass flow.

It should be appreciated by those skilled in the art that the data and framework presented herein demonstrates the use of two pressure sensors, located near the ends of a pair of vibrating flow tubes, to measure the process fluid speed of sound, and the ability to utilize that process fluid sound speed in conjunction with the measured mass flow and density of a Coriolis meter to correct for errors in the mass flow and density of said Coriolis meter operating in bubbly flows. However, the current disclosure is not limited to this demonstration. The methods and systems disclosed herein encompass other piping networks. For instance, the methods and systems disclosed herein inventively include any piping network where the speed of sound of a fluid within a piping section of interest having an inlet and an outlet can be determined by positioning at least a first acoustic pressure sensor upstream of the inlet and at least a second acoustic pressure sensor downstream of the outlet. As disclosed herein above, heretofore, it was thought that the array of pressure sensors must be positioned within the length of the pipe of interest. In addition, speed of sound measurement methods and devices of the prior art were positioned in piping systems in areas of contiguous uniform diameter piping sections. One reason for this practice was the notion that an acoustic wave propagating in a pipe having areas of non-contiguous uniform diameter piping (or partial obstruction or other changes in inner diameters) would produce reflections and would, in general, complicate the propagating acoustics within the piping network. It has been discovered that the speed of sound of a fluid within a piping network having significant variable volumetric acoustic impedance, i.e., changes in the characteristic volumetric impedance of an acoustic wave propagating in fluid within a piping network can be determined using the methods and systems of the current disclosure. It should be appreciated by those skilled in the art that, in addition to changes in the characteristic volumetric impedance of a fluid within a piping network, reflections can also be caused by discrete devices inserted in a section of piping, such as a pressure drop from a screen, or the acoustic interaction of a freely-rotating rotor (as disclosed in U.S. Pat. No. 5,872,342).

With reference to Munjal disclosed herein above, the acoustic impedance (z) of an acoustic wave propagating in a free space is typically defined as the ratio of the acoustic pressure perturbation (p) to the acoustic velocity perturbation (u). This ratio is a property of the fluid and given by:

$$Z \equiv \frac{p}{u} = \rho c \qquad \text{Equation 24}$$

Where $\rho$ is the density of the fluid and c is the speed of sound.

For one-dimensional acoustics propagating within a duct, the ratio of the acoustic pressure (p) in a one-dimensional acoustic wave to the acoustic volumetric velocity (uS), where S is the cross sectional area of the duct, is perhaps a more relevant characteristic of the one-dimensional acoustic properties of a fluid within a duct. This ratio can be defined as the characteristic volumetric impedance of a fluid within duct (Y), where Y is defined as:

$$Y \equiv \frac{p}{uS} = \frac{\rho c}{S} \qquad \text{Equation 25}$$

For acoustics propagating within ducts for which the mean fluid properties are essentially constant, the characteristic volumetric impedance is a function of the cross sectional area of the duct. As disclosed above, changes in the characteristic volumetric impedance result in reflections of propagating acoustics wave within a duct. Reflections of incident acoustic waves occur for incident acoustic waves from either direction within a piping network. For a piping network with one or more regions for which acoustics reflections are generated, the resulting acoustic field can be significantly different from the acoustic field that would have been present without any reflections.

There are numerous acoustic devices that utilize changes in the characteristic volumetric impedance of a duct to create desired effects, such as expansion chamber mufflers that reflect and dissipate incident acoustic energy to quiet exhaust pipes. Other examples include musical instruments that utilize abrupt area changes to change resonant frequencies on piping sections, for example the opening valves on a trumpet, and utilize gradual area changes to promote transmission of sound from essential one-dimensional acoustic waves within the instrument to three-dimensional sound waves external to the instrument, with for example the flaring of the horn of a trumpet.

It should thus be appreciated by those skilled in the art that area changes and other discrete devices with a piping network cause reflections, and reflections, in general, complicate the one-dimensional acoustic fields within a duct. As disclosed herein above with reference to Equations 1-3, one-dimensional sound can be generated anywhere within a piping network and propagate in both directions along the piping network. Any changes in the characteristic volumetric impedance of the fluid/duct system, causes additional reflections and transmission of the incident acoustic waves. That negative impact of cross-sectional area and impedance changes can best be seen with reference to graphical representation 30 in FIG. 3 disclosed herein above.

The methods and systems disclosed herein are applicable to a piping network for which there are significant changes in characteristic volumetric impedance of the piping network, or other sources of reflections such as discrete devices, in the regions of the piping network between at least a first and a second acoustic sensors. In the examples disclosed herein above, at least with reference to FIG. 1, the regions are referred to as Region 1, Region 2 and Region 3, wherein the section of piping network of interest (the region in which the process fluid speed of sound is sought) is within Region 2. It should be appreciated by those skilled in the art that Region 1, Region 2 and Region 3 are distinctly different regions of piping network and that sensors positioned in Region 1 and in Region 3 are used to determine a sound speed of the process fluid within Region 2 using the methods disclosed herein. As part of the current disclosure, the changes in characteristic volumetric impedance can be rapid or gradual in terms of rate of change with axial distance within the piping network. For example, rapid area changes due to a change in the cross section area in the piping network at a reducer, or reduced flow area though one or more flow tubes (14, FIG. 1) on a Coriolis meter 11, or flow splitters (83, 84, FIG. 8) in which the flow is splitting into more than one conduits, or side branch networks (1214, FIG. 12) on the piping network, or localized extended area change or pressure drop, such as associated with a coupling, a fitting, an orifice plate, V-cone differential pressure flow meter, a Venturi flow meter, a turbine meter, etc. In addition, a compliance change, i.e., an elasticity change of the conduit between the regions as disclosed herein above with reference to Equation 15, between the inlet region, the region of interest and the outlet region can also produce such reflections.

It should be appreciated by those skilled in the art that, although examples herein above relate to correcting the measurements of a Coriolis meter using the newly discovered ability to determine the speed of sound within the flow tubes of a Coriolis meter without positioning the sensors on the flow tubes, the methods and systems disclosed herein are applicable to other flow measuring systems that include fluid measurement devices. Such fluid measurement devices include any fluid measurement device for which there can be significant changes in characteristic volumetric impedance such as an orifice plate, V-cone differential pressure flow meter, a Venturi flow meter, a turbine meter, an electromagnetic flow meter, a SONAR flow meter, etc. The measured parameters of such devices can be corrected by positioning the device in place of the Coriolis meter in the various embodiments disclosed herein above with a first pressure sensor positioned near to and upstream of the inlet of the device and a second pressure sensor positioned near to and downstream of the outlet of the device.

All of the methods disclosed and claimed herein can be made and executed without undue experimentation in light of the present disclosure. While the apparatus and methods of this disclosure have been described in terms of preferred embodiments, it will be apparent to those of skill in the art that variations may be applied to the methods and in the steps or in the sequence of steps of the method described herein without departing from the concept, spirit and scope of the disclosure. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the disclosure.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated other The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations. In addition, although expressed as a "decoupling parameter" or a "decoupling parameter" and referred to in various forms such as $K_d$, $K_D$, $k_D$ or $k_d$ these terms and symbols have equal meaning within this disclosure. Similarly, although expressed as a "decoupling parameter" or a "decoupling parameter" and referred to in various forms such as $K_m$, $K_M$, $k_m$ or $k_M$ these terms and symbols have equal meaning within this disclosure. Other such equivalent nomenclature should also be understood as equivalents unless otherwise expressly stated herein.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A fluid flow measuring system comprising:
   a piping network;
   an array of a first acoustic sensor positioned within the piping network and a second acoustic sensor positioned within the piping network;
   an aperture that spans a length of the piping network between the first acoustic sensor and the second acoustic sensor;
   at least one change in a characteristic volumetric impedance comprising at least a change in a cross sectional area of the piping network within the aperture; and
   a processing unit that determines a speed of sound of a process fluid within the aperture using the first acoustic sensor and the second acoustic sensor;
   at least one vibrating flow tube of a Coriolis meter positioned fully within the aperture between the first acoustic sensor and the second acoustic sensor; and wherein the piping network further comprises at least one flow splitter positioned within the aperture.

2. The fluid flow measuring system of claim 1 wherein the first acoustic sensor is configured to measure a first acoustic pressure and the second acoustic sensor is configured to measure a second acoustic pressure and to produce a first acoustic sensor signal and a second acoustic sensor signal.

3. The fluid flow measuring system of claim 2 wherein the processing unit determines the speed of sound of the process fluid in the aperture using a phase shift between the first acoustic sensor signal and the second acoustic sensor signal using a beam forming technique.

4. The fluid flow measuring system of claim 3 wherein the processing unit determines a parameter of the process fluid using the speed of sound.

5. The fluid flow measuring system of claim 4 wherein the parameter of the process fluid is a gas void fraction of the process fluid.

6. The fluid flow measuring system of claim 2 wherein the piping network further comprises an inlet pipe positioned at least partially within the aperture and an outlet pipe positioned at least partially within the aperture; and
wherein the first acoustic sensor is positioned within the inlet pipe and the second acoustic sensor is positioned within the outlet pipe.

7. The fluid flow measuring system of claim 1 wherein any of the first acoustic sensor and the second acoustic sensor are not mounted on the at least one vibrating flow tube.

8. The fluid flow measuring system of claim 7 wherein the Coriolis meter is configured to provide a measured parameter of the process fluid and wherein the processing unit is further configured to correct the measured parameter using at least one of the speed of sound and a gas void fraction.

9. The fluid flow measuring system of claim 8 wherein the Coriolis meter is configured to provide any of a measured density of the process fluid, a volumetric flow rate of the process fluid and a measured mass flow of the process fluid, the processing unit further configured to provide any of a corrected density of the process fluid, a corrected volumetric flow, and a corrected mass flow of the process fluid using any of the speed of sound and the gas void fraction.

10. The fluid flow measuring system of claim 7 wherein the array comprises a two sensor array comprised of only two acoustic sensors, including the first acoustic sensor and the second acoustic sensor.

11. The fluid flow measuring system of claim 10 is positioned within the piping network proximate the at least one change in a characteristic volumetric impedance.

12. The fluid flow measuring system of claim 1 further comprising:
the first acoustic sensor is configured to measure a first acoustic pressure and the second acoustic sensor is configured to measure a second acoustic pressure and to produce a first acoustic sensor signal and a second acoustic sensor signal;
an inlet flange positioned in an inlet region of the piping network having an inlet flange pressure port;
an outlet flange positioned in an outlet region of the piping network having an outlet flange pressure port; and
wherein the first acoustic sensor is disposed within the inlet flange pressure port and the second acoustic sensor is disposed within the outlet flange pressure port.

13. The fluid flow measuring system of claim 1 further comprising:
the first acoustic sensor is configured to measure a first acoustic pressure and the second acoustic sensor is configured to measure a second acoustic pressure and to produce a first acoustic sensor signal and a second acoustic sensor signal;
an inlet throat positioned an inlet region of the piping network having an inlet throat pressure port;
an outlet throat positioned in an outlet region of the piping network having an outlet throat pressure port; and
wherein the first acoustic sensor is disposed within the inlet throat pressure port and the second acoustic sensor is disposed within the outlet throat pressure port.

14. The fluid flow measuring system of claim 1 wherein any of the at least one change in the characteristic volumetric impedance and a change in the elasticity of the piping network produces a presence of a plurality of reflections of incident acoustic waves in the process fluid within the aperture; and
wherein the processing unit determines the speed of sound of the process fluid within the aperture in the presence of the plurality of reflections of incident acoustic waves.

15. The fluid flow measuring system of claim 1 wherein the at least one change in the characteristic volumetric impedance comprises any of a pressure drop, a coupling, a fitting, an orifice plate, a differential pressure flow meter, a Venturi flow meter and a turbine meter.

16. The fluid flow measuring system of claim 1 wherein the array comprises a two sensor array comprised of only two acoustic sensors, including the first acoustic sensor and the second acoustic sensor.

17. The fluid flow measuring system of claim 16 wherein at least one of the first acoustic sensor and the second acoustic sensor is positioned within the piping network proximate the at least one change in a characteristic volumetric impedance.

18. The fluid flow measuring system of claim 1 wherein the first acoustic sensor comprises a first strain-based sensor and the second acoustic sensor comprises a second strain based sensor.

19. The fluid flow measuring system of claim 18 wherein the first strain based sensor comprises a clamp on strain based sensor and the second strain based sensor comprises a clamp on strain based sensor.

20. A method of measuring a process fluid parameter comprising:
providing a piping network;
providing a process fluid within the piping network;
providing an array by positioning a first acoustic sensor within the piping network and positioning a second acoustic sensor within the piping network wherein the array has an aperture that spans a length of the piping network between the first acoustic sensor and the second acoustic sensor;
wherein at least one change in a characteristic volumetric impedance comprising at least a change in a cross sectional area of the piping network occurring within the aperture; and
determining with a processing unit a speed of sound of the process fluid within the aperture using the first acoustic sensor and the second acoustic sensor;
positioning at least one vibrating flow tube of a Coriolis meter within the aperture between the first acoustic sensor and the second acoustic sensor; and
positioning at least one flow splitter within the aperture.

21. The method of measuring a process fluid parameter of claim 20 further comprising:

measuring a first acoustic pressure with the first acoustic sensor;

measuring a second acoustic pressure with the second acoustic sensor; and producing a first acoustic sensor signal and a second acoustic sensor signal.

22. The method of measuring a process fluid parameter of claim 21 further comprising:

positioning an inlet pipe at least partially within the aperture;

positioning an outlet pipe at least partially within the aperture;

positioning the first acoustic sensor within the inlet pipe; and positioning the second acoustic sensor within the outlet pipe.

23. The method of measuring a process fluid parameter of claim 22 further comprising positioning a Coriolis meter positioned at least partially within the aperture.

24. The method of measuring a process fluid parameter of claim 20 determining with the processing unit the speed of sound of the process fluid in the aperture using the first acoustic sensor signal and the second acoustic sensor signal using a beam forming technique.

25. The method of measuring a process fluid parameter of claim 24 further comprising determining with the processing unit a parameter of the process fluid using the speed of sound.

26. The method of measuring a process fluid parameter of claim 25 wherein the parameter comprises determining a gas void fraction of the process fluid.

27. The method of measuring a process fluid parameter of claim 20 wherein any of the first acoustic sensor and the second acoustic sensor are not mounted on the at least one vibrating flow tube.

28. The method of measuring a process fluid parameter of claim 27 further comprising:

measuring with the Coriolis meter a measured parameter of the process fluid; and correcting with the processing unit the measured parameter using at least one of the speed of sound and a gas void fraction.

29. The method of measuring a process fluid parameter of claim 28 further comprising:

providing with the Coriolis meter any of a measured density of the process fluid, a volumetric flow rate of the process fluid and a measured mass flow of the process fluid; and correcting with the processing unit any of a corrected density of the process fluid, a corrected volumetric flow, and a corrected mass flow of the process fluid using any of the speed of sound and the gas void fraction.

30. The method of measuring a process fluid parameter of claim 20 further comprising:

positioning an inlet flange in an inlet region of the piping network having an inlet flange pressure port;

positioning an outlet flange in an outlet region of the piping network having an outlet flange pressure port;

disposing the first acoustic sensor within the inlet flange pressure port;

positioning the second acoustic sensor within the outlet flange pressure port;

measuring a first acoustic pressure with the first acoustic sensor;

measuring a second acoustic pressure with the second acoustic sensor; and producing a first acoustic sensor signal and a second acoustic sensor signal.

31. The method of measuring a process fluid parameter of claim 20 further comprising:

positioning an inlet throat in an inlet region of the piping network having an inlet throat pressure port;

positioning an outlet throat in an outlet region of the piping network having an outlet throat pressure port;

positioning the first acoustic sensor within the inlet throat pressure port;

positioning the second acoustic sensor within the outlet throat pressure port;

measuring a first acoustic pressure with the first acoustic sensor;

measuring a second acoustic pressure with the second acoustic sensor; and producing a first acoustic sensor signal and a second acoustic sensor signal.

32. The method of measuring a process fluid parameter of claim 20 further comprising:

producing with any of the at least one change in the characteristic volumetric impedance and a change in the elasticity of the piping network a plurality of reflections of incident acoustic waves in the process fluid within the aperture; and determining with the processing unit the speed of sound of the process fluid within the aperture in the presence of the plurality of reflections of incident acoustic waves.

33. The method of measuring a process fluid parameter of claim 20 wherein the at least one change in the characteristic volumetric impedance comprises any of a pressure drop, a coupling, a fitting, an orifice plate, a differential pressure flow meter, a Venturi flow meter and a turbine meter.

34. The method of measuring a process fluid parameter of claim 20 wherein the first acoustic sensor comprises a first strain-based sensor and the second acoustic sensor comprises a second strain based sensor.

35. The method of measuring a process fluid parameter of claim 34 wherein the first strain based sensor comprises a clamp on strain based sensor and the second strain based sensor comprises a clamp on strain based sensor.

* * * * *